(12) United States Patent
Yoshihara et al.

(10) Patent No.: US 7,573,521 B2
(45) Date of Patent: Aug. 11, 2009

(54) SOLID-STATE IMAGE SENSING DEVICE

(75) Inventors: Satoshi Yoshihara, Kanagawa (JP); Yasuhito Maki, Kanagawa (JP)

(73) Assignee: Sony Corporation (JP)

( * ) Notice: Subject to any disclaimer, the term of this patent is extended or adjusted under 35 U.S.C. 154(b) by 339 days.

(21) Appl. No.: 11/478,685

(22) Filed: Jul. 3, 2006

(65) Prior Publication Data
US 2006/0250512 A1    Nov. 9, 2006

Related U.S. Application Data

(62) Division of application No. 10/247,557, filed on Sep. 20, 2002, now Pat. No. 7,071,977, which is a division of application No. 08/676,731, filed on Jul. 8, 1996, now Pat. No. 6,480,228.

(30) Foreign Application Priority Data

Jul. 10, 1995   (JP)   ............................... P07-173222

(51) Int. Cl.
*H04N 5/335* (2006.01)
(52) U.S. Cl. ...................................... 348/312
(58) Field of Classification Search ................. 348/311, 348/312
See application file for complete search history.

(56) References Cited

U.S. PATENT DOCUMENTS

| | | |
|---|---|---|
| 4,742,392 A | 5/1988 | Hashimoto |
| 4,816,917 A | 3/1989 | Yamamoto et al. |
| 4,819,070 A | 4/1989 | Hynecek |
| 4,875,098 A | 10/1989 | Yamamoto et al. |
| 4,886,986 A | 12/1989 | Watanabe |
| 5,067,168 A | 11/1991 | Nagano |
| 5,126,860 A | 6/1992 | Nagano |
| 5,132,803 A | 7/1992 | Suga et al. |
| 5,136,402 A | 8/1992 | Nagano |
| 5,153,929 A | 10/1992 | Itagaki |
| 5,166,811 A | 11/1992 | Nagano |
| 5,235,412 A | 8/1993 | Boisvert et al. |
| 5,650,784 A * | 7/1997 | Hikosaka et al. ............ 341/139 |
| 5,717,459 A | 2/1998 | Maki et al. |
| 5,801,850 A | 9/1998 | Maki et al. |
| 6,480,228 B1 | 11/2002 | Yoshihara et al. |

FOREIGN PATENT DOCUMENTS

JP       07-030820       1/1995

* cited by examiner

*Primary Examiner*—Tuan V Ho
(74) *Attorney, Agent, or Firm*—Rader Fishman & Grauer PLLC; Ronald P. Kananen

(57) ABSTRACT

When a signal output by a solid-state image sensing device is clamped to a predetermined reference potential, a high voltage generated in a transfer suspension period after the clamping as generally supplied to an A/D converter is generated. A sample/hold output Va is clamped to a clamp level Vref over a period of time between a halfway point of time of a signal of a picture element preceding ahead by one line and the end of an inhibit period of transfer clocks of a signal output by an empty transmission unit via a first clamp pulse and a sample/hold output for the second picture element, or a subsequent one of an OPB unit is clamped to the clamp level via a second clamp pulse to prevent a signal output from exceeding a reference voltage from being supplied to an A/D converter at a later stage.

7 Claims, 23 Drawing Sheets

BLOCK DIAGRAM SHOWING A TYPICAL CLAMP PULSE GENERATING CIRCUIT IMPLEMENTED BY THE THIRD EMBODIMENT

CIRCUIT DIAGRAM OF A TYPICAL SIGNAL PROCESSING UNIT

TIMING CHARTS FOR EXPLAINING THE OPERATIONS OF A FIRST EMBODIMENT

BLOCK DIAGRAM OF A TYPICAL CLAMP PULSE GENERATING CIRCUIT IMPLEMENTED BY THE FIRST EMBODIMENT

BLOCK DIAGRAM OF A TYPICAL 11-BIT COUNTER

TIMING CHARTS FOR EXPLAINING THE OPERATIONS OF A SECOND EMBODIMENT

BLOCK DIAGRAM SHOWING A TYPICAL CLAMP PULSE SIGNAL GENERATING CIRCUIT IMPLEMENTED BY THE SECOND EMBODIMENT

TIMING CHARTS FOR EXPLAINING THE OPERATIONS OF A THIRD EMBODIMENT

BLOCK DIAGRAM SHOWING A TYPICAL CLAMP PULSE GENERATING CIRCUIT IMPLEMENTED BY THE THIRD EMBODIMENT

FIG. 13 TIMING CHARTS FOR EXPLAINING THE OPERATIONS OF A FOURTH EMBODIMENT

BLOCK DIAGRAM SHOWING A TYPICAL CLAMP PULSE GENERATING CIRCUIT IMPLEMENTED BY THE FOURTH EMBODIMENT

TIMING CHARTS FOR EXPLAINING THE OPERATIONS OF THE CLAMP PULSE GENERATING CIRCUIT SHOWN IN FIG. 14

FIG. 16 TIMING CHARTS FOR EXPLAINING THE OPERATIONS OF A FIFTH EMBODIMENT

BLOCK DIAGRAM SHOWING A TYPICAL CLAMP PULSE GENERATING CIRCUIT IMPLEMENTED BY THE FIFTH EMBODIMENT

FIG. 19 TIMING CHARTS FOR EXPLAINING THE OPERATIONS OF A SIXTH EMBODIMENT

BLOCK DIAGRAM SHOWING A TYPICAL CLAMP PULSE GENERATING CIRCUIT IMPLEMENTED BY THE SIXTH EMBODIMENT

CONFIGURATION DIAGRAM OF A TYPICAL SOLID-STATE IMAGE SENSING DEVICE EMPLOYING AREA SENSORS

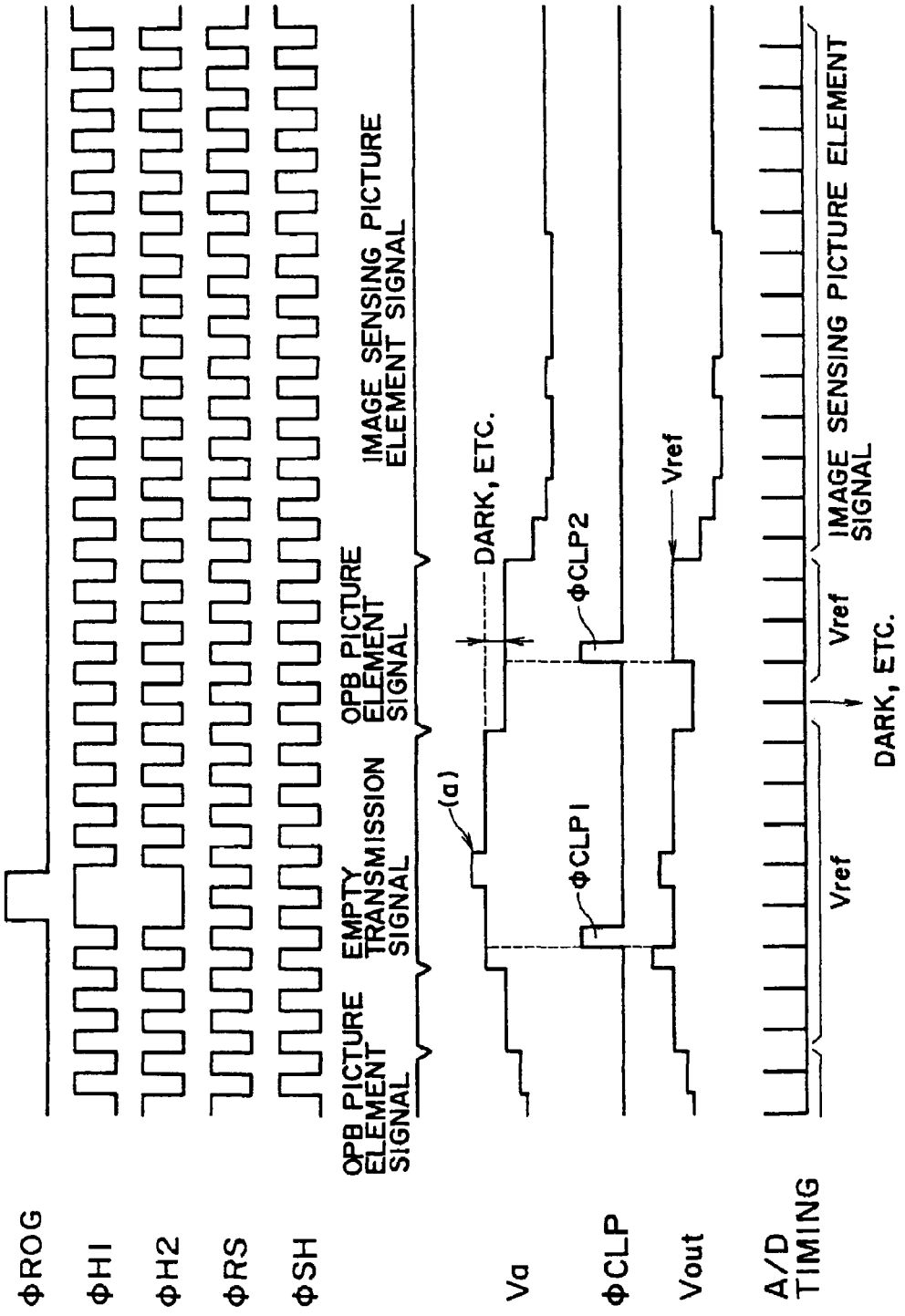

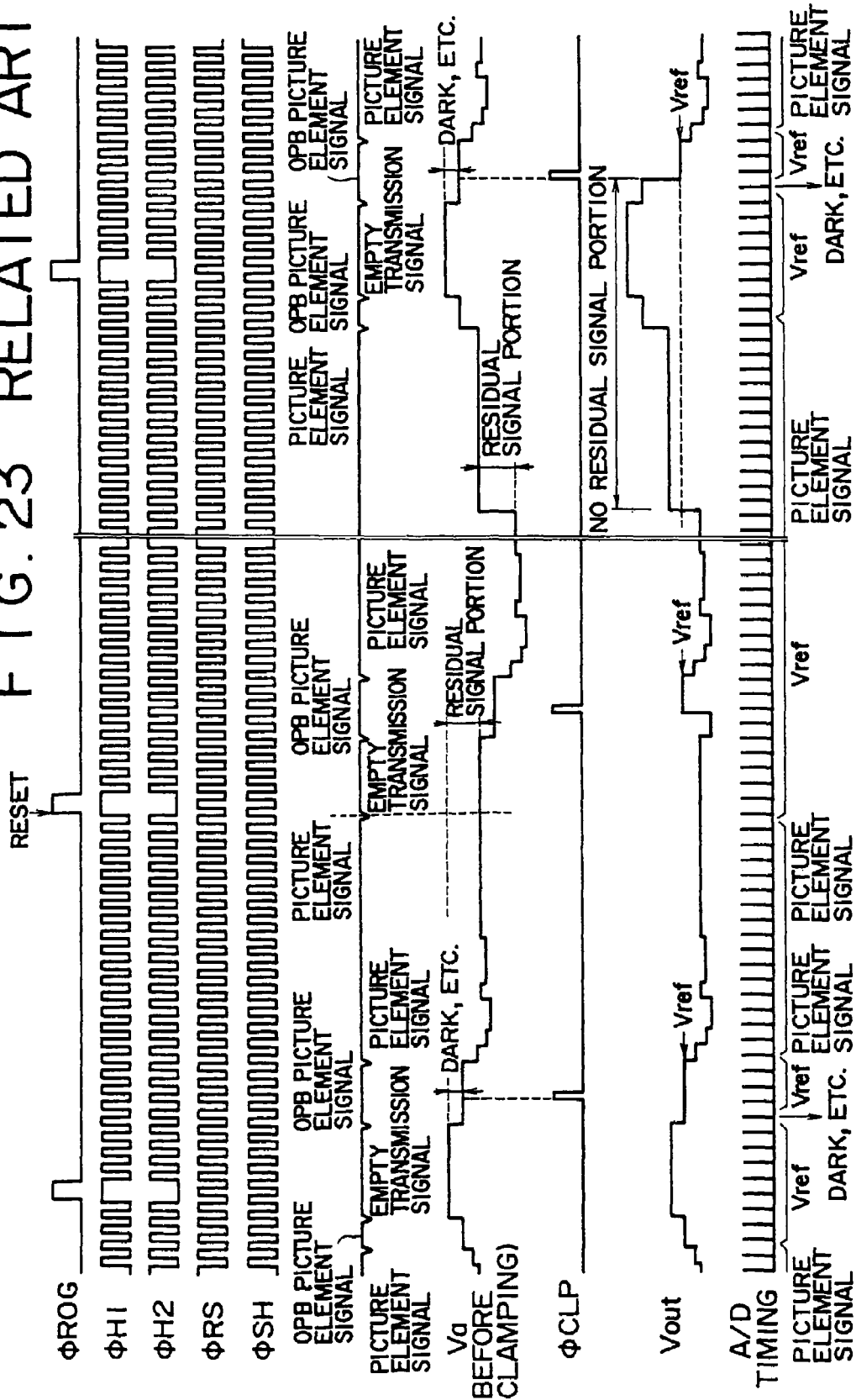

SOLID-STATE IMAGE SENSING DEVICE

RELATED APPLICATIONS

This application is a divisional application of application Ser. No. 10/247,557, filed on Sep. 20, 2002, now U.S. Pat. No. 7,071,977, which is a divisional application of application Ser. No. 08/676,731, filed on Jul. 8, 1996, now U.S. Pat. No. 6,480,228, the entire contents of which are being incorporated herein by reference. The present application claims priority based on Japanese Patent Application No. 07-173222, filed Jul. 10, 1995, the entirety of which being incorporated herein by reference.

BACKGROUND OF THE INVENTION

In general, the present invention relates to a solid-state image sensing device which employs solid-state image sensing elements which serve as area or linear sensors. In particular, the present invention relates to a solid-state image sensing device which clamps a signal output by a solid-state image sensing element thereof to a predetermined reference potential.

RELATED ART

In a solid-state image sensing device employing CCD solid-state image sensing elements such as CCD linear sensors as shown in FIG. 1, differential operations are carried out at a signal processing unit 15 at a later stage by clamping a black level or holding samples in order to compensate for an offset due to the optical transmission through a CCD shift register (serving as an electric-charge transferring unit) 13 for transferring signal electric charge read out from a sensor array 11 and to cancel dark-current components.

An actual circuit configuration of the signal processing unit 15 is shown in FIG. 2. Here, by the black level, the level of picture element signals at shading units 11a and 11b which are also referred to as optical black (OPB) units at the sensor array 11 is meant. The shading units 11a and 11b are also referred to hereafter as a second OPB unit and a first OPB unit respectively.

In order to process digitally a signal output Vout, an A/D converter 16 is provided at a later stage of the signal processing unit 15. The signal output Vout, a clamped output of a clamp circuit 22, is converted into a digital signal by the A/D converter 16. In this case, by setting the clamp level of the clamp circuit 22 at a reference potential Vref of the A/D converter 16, a wide input D (dynamic) range of the A/D converter 16 can be utilized. In general, the reference potential Vref of the A/D converter 16 is set at the maximum level of the input D range.

When only the picture element signal output by the first OPB unit 11b is clamped to the reference potential Vref of the A/D converter 16 in the clamp processing of this black level, a dark current and offset due to the optical transmission through the CCD shift register 13 may be raised to a higher level. In this case, the signal level at the empty transmission unit 13a of the CCD shift register 13 becomes higher than the level of the picture element signals of the OPB units 11a and 11b by a difference caused by the dark current and the like. Accordingly, if its clamped output is supplied to the A/D converter 16 as it is, a signal voltage higher than the reference potential Vref, which is set at the maximum level of the D range, will be input to the A/D converter 16. As a result, such a configuration gives rise to problems that the A/D converter 16 does not function correctly and data resulting from the A/D conversion is therefore damaged. On the top of that, if the worst comes to the worst, the A/D converter 16 itself is damaged.

In addition, the signal output by the empty transmission unit 13a of the CCD shift register 13 can also be clamped to the reference potential Vref of the A/D converter 16. In this case, the D range of the A/D converter 16 that can be used for the signal becomes narrower by the dark-current portion. On the top of that, when the dark-current portion changes due to a change in temperature or the like, the level of the image sensing picture element signal is also shifted by a displacement determined by the dark-current portion. As a result, signal processing for subtracting the dark-current portion and the like is required, inevitably making the circuit configuration accordingly complicated.

In order to solve the problems described above, a solid-state image sensing device is disclosed in Japanese Patent Laid-open No. Hei 7-30820 with a configuration wherein a timing generator 17 generates clamp pulses φCLP1 and φCLP2 for clamping the signals of the empty transmission unit 13a of the CCD shift register 13 and the OPB unit 11b on the rear side of the sensor array 11 respectively each over a period of time corresponding to one picture element as shown in timing charts of FIG. 22. The clamp pulse φCLP1 is set with clamp timing for a signal portion of a signal output by the empty transmission unit 13a of the CCD shift register 13 corresponding to the first picture element while the clamp pulse φCLP2 is set with clamp timing for a portion of a signal output by the OPB unit 11b on the rear side of the sensor array 11 corresponding to the second picture element or a subsequent one. On the other hand, the A/D conversion is carried out by the A/D converter 16 on a later stage with timing not to sample a portion of a signal output by the empty transmission unit 13a of the CCD shift register 13 corresponding to the first picture element.

It should be noted that notation φROG shown in timing charts of FIG. 22 denotes a read gate pulse which is applied to a shift gate 12 for reading out signal electric charge from the sensor array 11. Notations φH1 and φH2 are transfer clocks of the CCD shift register 13 whereas notation φRS is a reset pulse for resetting an electric-charge detecting unit 14. Notation φSH is a sample/hold pulse for a sample/hold circuit 21 of a signal processing unit 15. Notation Va is a sample/hold signal output by the sample/hold circuit 21 whereas notation φCLP (strictly speaking, notations φCLP1 and φCLP2) are clamp pulses of a clamp circuit 22. Notation Vout denotes a signal output.

In the conventional solid-state image sensing device with the configuration described above, a portion of a signal output by the empty transmission unit 13a of the CCD shift register 13 corresponding to the first picture element is clamped by the clamp pulse φCLP1. However, a technique for preventing a signal voltage higher than the reference potential Vref of the A/D converter 16 from being supplied to the A/D converter 16 over an entire period of the empty transmission is not taken into consideration.

When signal electric charge is read out from the sensor array 11 to the CCD shift register 13 by application of the read gate pulse φROG, by halting transfer clock signals φH1 and φH2, the transfer operation carried out by the CCD shift register 13 is suspended temporarily. In this transfer suspension period, no signal electric charge is injected into an FD unit of the electric-charge detecting unit 14. On the top of that, by applying a reset pulse φRS, a reset state is established, putting the detection output of the electric-charge detecting unit 14 at the highest potential. As a result, by merely clamping a portion of a signal output by the empty transmission unit 13a corresponding to the first picture element using the clamp pulse φCLP1, a high voltage (a) in the transfer suspension period generated thereafter is supplied as it is to the A/D converter 16 as a signal output Vout.

In addition, in the case of the conventional technology described above, the operation to clamp a portion of a signal output by the empty transmission unit 13a corresponding to the first picture element using the clamp pulse φCLP1 prevents a signal voltage higher than the reference potential Vref of the A/D converter 16 from being supplied to the A/D converter 16 only during a minimum unit time of the empty transmission period. On the other hand, the A/D converter 16 does not sample a portion of a signal output by the empty transmission unit 13a corresponding to the first picture element. As a result, a signal voltage higher than the reference potential Vref of the A/D converter 16 is not supplied to the A/D converter 16. In order to implement this scheme, however, the sampling time of the A/D converter 16 must be set so that a portion of a signal output by the empty transmission unit 13a corresponding to the first picture element is not sampled, giving rise to a difficulty that it is necessary to modify the sampling time of the A/D converter which is implemented by an externally attached circuit.

In addition, if a reset is applied in the course of transferring signal electric charge by setting the reset pulse φROG as is the case with a forced reset aiming at, among other things, a change in exposure time, a newly read out signal is added to a residual signal being transferred in the CCD shift register 13. In this case, the picture element signals output by the OPB units 11a and 11b are increased in magnitude by the residual signal portion. As a result, if only a signal output by the OPB unit 11b is clamped, the signal voltages of the image sensing picture element signal portion with no residual signal, the OPB unit 11a and the empty transmission unit 13a become higher than the reference potential Vref as shown in FIG. 23. Thus, much like the case described previously, if the clamped output is supplied to the A/D converter 16 as it is, the A/D converter 16 will not function correctly and data resulting from the A/D conversion is therefore incorrect. In addition, the A/D converter 16 itself could be damaged in an extreme case.

BRIEF SUMMARY OF THE INVENTION

The present invention addresses the problems described above. It is an object of the present invention to provide a solid-state image sensing device wherein a signal output by a solid-state image sensing element employed thereby is clamped to a predetermined reference potential so as to eliminate an adverse effect on an A/D converter at a later stage.

A timing generator employed in a solid-state image sensing device according to one aspect of the invention has a configuration wherein clamp pulses are generated for clamping a signal portion corresponding to at least one picture element of an OPB unit on the rear side in a signal output by a solid-state image sensing element and for clamping a signal output by an empty transmission unit of an electric-charge transferring unit over a period of time covering an inhibit period of transfer clocks.

A timing generator employed in a solid-state image sensing device according to a second feature of the invention has a configuration wherein clamp pulses are generated for clamping a signal portion corresponding to at least one picture element of an OPB unit on the rear side in a signal output by a solid-state image sensing element and for clamping a signal over a period of time between a halfway point of time in a signal output by an OPB unit on the front side and a halfway point of time in a signal output by an empty transmission unit of an electric-charge transferring unit.

A timing generator employed in a solid-state image sensing device according to a third feature of the invention has a configuration wherein clamp pulses are generated for clamping a signal portion corresponding to at least one picture element of an OPB unit on the rear side in a signal output by a solid-state image sensing element and for clamping a signal over a period of time between a halfway point of time in a signal output by an OPB unit on the front side and the end of an inhibit period of transfer clocks for a signal output by an empty transmission unit of an electric-charge transferring unit.

A timing generator employed in a solid-state image sensing device according to still another fourth feature of the invention has a configuration wherein clamp pulses are generated for clamping a signal portion corresponding to at least one picture element of an OPB unit on the rear side in a signal output by a solid-state image sensing element and for clamping a signal over a period of time between a halfway point of time in a signal of the last picture element preceding ahead by one line and the end of an inhibit period of transfer clocks for a signal output by an empty transmission unit of an electric-charge transferring unit.

A timing generator employed in a solid-state image sensing device according to a fifth feature of the invention has a configuration wherein a clamp pulse is generated for clamping at least a picture element signal not superpositioned on a picture element signal obtained from a previous read operation in case an operation to read signal electric charge occurs during a transfer period of signal electric charge.

A timing generator employed in a solid-state image sensing device according to another sixth feature of the invention has a configuration including an inhibit circuit for inhibiting generation of clamp pulses in synchronization with an operation to read out signal electric charge during a transfer period of signal electric charge in case such a read operation occurs.

In the solid-state image sensing device according to the first aspect of the invention, a signal portion output by the OPB unit on the rear side in a signal output by the solid-state image sensing element is clamped so as to detect a signal level of the OPB unit which level serves as a reference of level detection of a dark current and the like. In addition, by clamping the signal output by the empty transmission unit of the electric-charge transferring unit over a period of time including the inhibit period of the transfer clocks of the electric-charge transferring unit, a high signal voltage generated in company with transfer suspension caused by the inhibition of the transfer clocks can be masked out so that the high signal voltage is not supplied to an A/D converter at a later stage.

In the solid-state image sensing device according to a second feature of the invention, a signal portion output by the OPB unit on the rear side in a signal output by the solid-state image sensing element is clamped so as to detect a signal level of the OPB unit which level serves as a reference of level detection of a dark current and the like. In addition, by clamping a signal over a period of time between a halfway point of time in the signal of the OPB unit on the front side and a halfway point of time in the signal output by the empty transmission unit of the electric-charge transferring unit, a signal voltage higher than a reference voltage which signal voltage accompanies a dark current and the like is not generated at all over the entire empty transmission portion.

In particular, in the solid-state image sensing device according to a third feature of the invention, by clamping a signal over a period of time between a halfway point of time in a signal output by an OPB unit on the front side and the end of an inhibit period of transfer clocks for a signal output by an empty transmission unit of an electric-charge transferring unit, in addition to the fact that a signal voltage higher than a reference voltage which signal voltage accompanies a dark current and the like is not generated at all over the entire empty transmission portion, a high signal voltage generated in company with transfer suspension caused by the inhibition of the transfer clocks can also be masked out.

In the solid-state image sensing device according to the fourth feature of the invention, the signal output by an OPB unit on the rear side in a signal output by the solid-state image sensing element is clamped so as to detect a signal level of the OPB unit which level serves as a reference of level detection of a dark current and the like. In addition, by clamping a signal over a period of time between a halfway point of time in a signal of the last picture element preceding ahead by one line and the end of an inhibit period of transfer clocks for a signal output by an empty transmission unit of an electric-charge transferring unit, in addition to the fact that a signal voltage higher than a reference voltage which signal voltage accompanies a dark current and the like is not generated at all over the entire empty transmission portion, a high signal voltage generated in company with transfer suspension caused by the inhibition of the transfer clocks can also be masked out. On the top of that, the signal voltage of the OPB unit on the front side can also be masked out as well.

In the solid-state image sensing device according to a fifth aspect of the invention, when an operation to read out electric charge is carried out in a transfer period of signal electric charge, by clamping at least a picture element signal not superpositioned on a picture element signal output by a previous read operation, the signal voltages of the image sensing picture element signal portion with no residual signal, the OPB unit and the empty transmission unit can be suppressed to a level below the reference voltage. As a result, a reset is applied in the course of transferring signal electric charge so that the signal voltages of the image sensing picture element signal portion with no residual signal, the OPB unit and the empty transmission unit will never exceed the reference voltage even if a newly read out signal is superpositioned on a residual signal being transferred in the electric-charge transferring unit.

In the solid-state image sensing device according to the sixth feature of the invention, when an operation to read out electric charge is carried out in a transfer period of signal electric charge, by inhibiting the generation of clamp pulses in synchronization with the operation to read out electric charge, a reset is applied in the course of transferring signal electric charge so that, even if a newly read out signal is superpositioned on a residual signal being transferred in the electric-charge transferring unit, causing the picture element signals of the OPB units to increase in magnitude by the residual signal portion, the clamping of signals output by the OPB units is not carried out. As a result, the signal voltages of the image sensing picture element signal portion with no residual signal, the OPB unit and the empty transmission unit can be suppressed to a level below the reference voltage.

BRIEF DESCRIPTION OF THE DRAWINGS

FIG. 22 shows a first set of timing charts used for explaining the operations of the conventional solid-state image sensing device of FIGS. 1 and 2; and FIG. 23 shows a second set of timing charts used for explaining the operations of the conventional solid-state image sensing device.

DETAILED DESCRIPTION OF THE PREFERRED EMBODIMENTS

The present invention will become apparent from the following detailed description of preferred embodiments with reference to accompanying diagrams.

Figure 1:
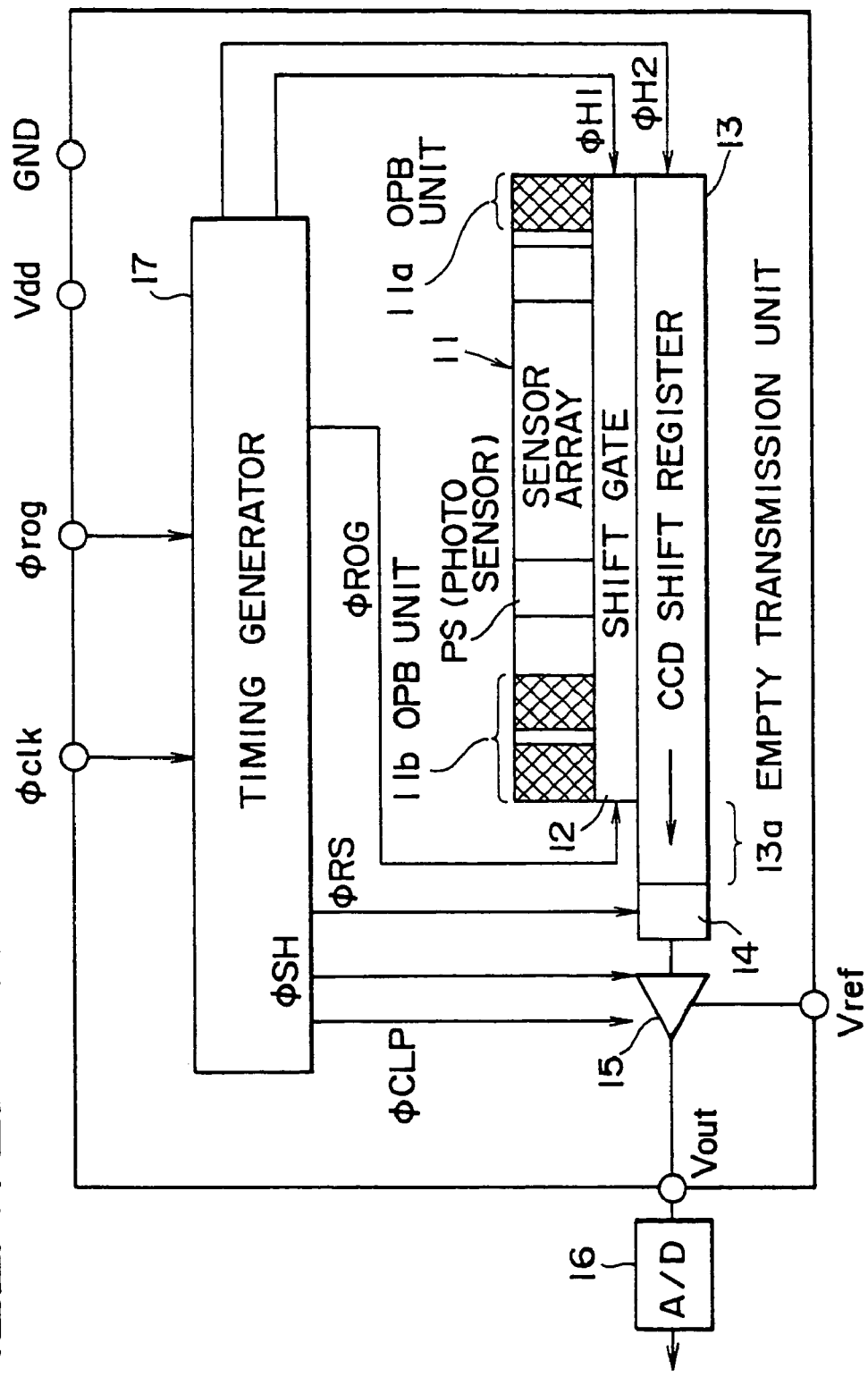
FIG. 1 is a configuration diagram showing a typical solid-state image sensing device known in the related art and employing linear sensors in accordance with the present invention.

FIG. 1 is a configuration diagram showing a typical solid-state image sensing device provided by the present invention which device employs, typically, linear sensors. As shown in the figure, the configuration includes a sensor array or a sensor unit 11 comprising a plurality of photosensors PS which are arranged to form a one-dimensional array. Each of the photosensors is used for carrying out opto-electric conversion, whereby incident light is converted into signal electric charge having an amount proportional to the quantity of the light, and for accumulating the signal electric charge. OPB units 11*a* and 11*b* each shown as meshes of a net in the figure are provided at the front and rear ends of the sensor array 11 in the time-axis direction respectively. In each of the OPB units 11a and 11b, a plurality of picture elements is shaded. The signal electric accumulated in the sensor array 11 in picture element units is read out and transferred to a CCD shift register (an electric-charge transferring unit) 13 through a shift gate 12.

The read out signal electric charge is transferred sequentially by the CCD shift register 13 and supplied to an electric-charge detecting unit 14. It should be noted that, as seen in FIG. 1, the CCD shift register 13 includes an empty transmission unit 13a only for empty transmission of signal electric charge in addition to transfer regions associated with picture elements of the sensor unit 11. The empty transmission unit 13a is provided at the end of the CCD shift register 13 close to the electric-charge detecting unit 14. Typically made by floating diffusion (FD), the electric-charge detecting unit 14 detects signal electric charge transferred by the CCD shift register 13 and injected into an FD unit of the electric-charge detecting unit 14 and converts the signal electric charge into a signal voltage to be supplied to a signal processing unit 15 at a later stage.

Figure 2:
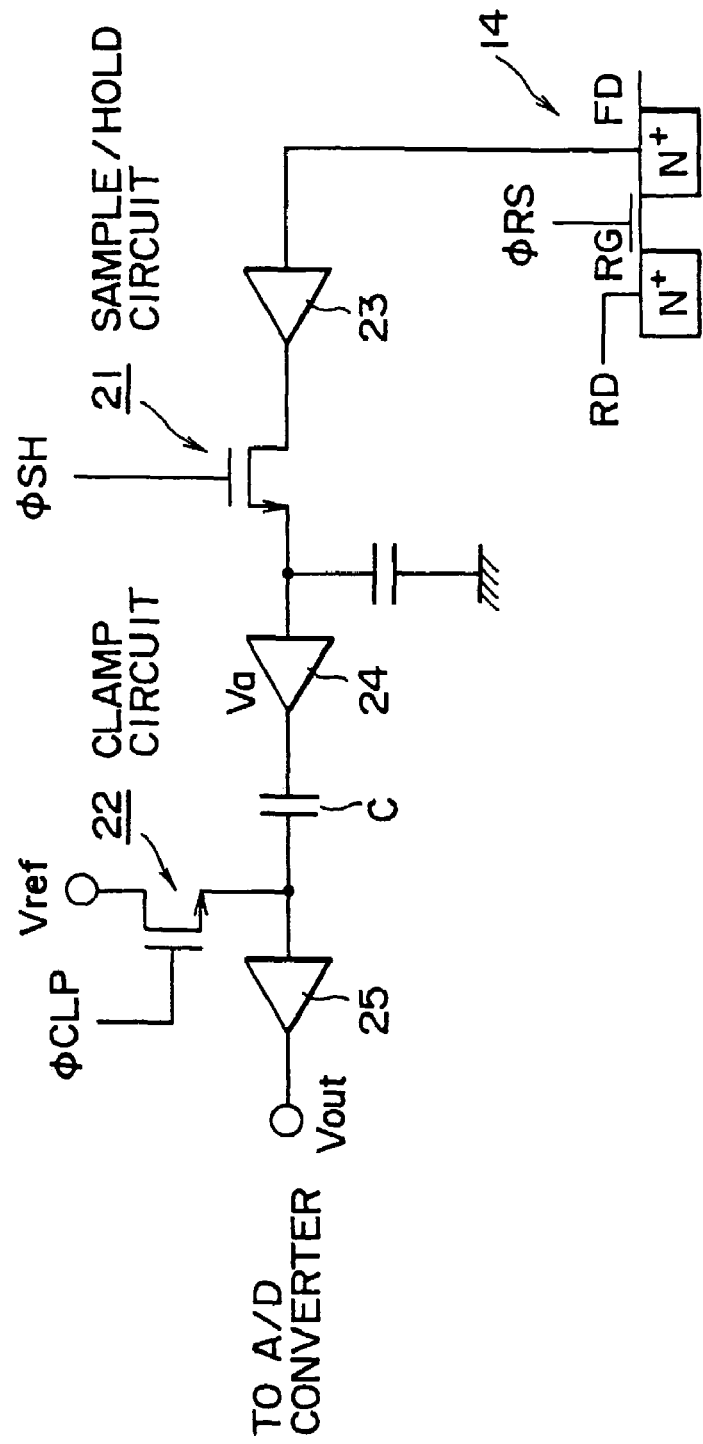
FIG. 2 is a circuit diagram showing a typical actual configuration of a signal processing unit used in FIG. 1.

A typical actual circuit configuration of the signal processing unit 15 is shown in FIG. 2. As shown in the figure, the signal processing unit 15 comprises a sample/hold circuit 21 and a clamp circuit 22. The sample/hold circuit 21 is used for sampling and holding a signal voltage supplied by the electric-charge detecting unit 14 through a buffer 23. The clamp circuit 22 is used for clamping a sample/hold output supplied by the sample/hold circuit 21 through a buffer 24 and an alternating-current coupling condenser C and for supplying a signal at a clamped level to an A/D converter 16 through a buffer 25. The signal processing unit 15 is created on the same substrate as the CCD chip. The clamp level of the clamp circuit 22 is set at a reference level Vref of the A/D converter 16.

As described above, in this example, the clamp circuit 22 is placed at the later stage of the sample/hold circuit 21 and has a circuit configuration which clamps a sample/hold output. It should be noted that it is possible to place the clamp circuit 22 at the front stage of the sample/hold circuit 21. In this case, the clamp circuit 22 has a circuit configuration for clamping a detection signal output by the electric-charge detecting unit 14.

In addition, the timing generator 17 for generating a variety of timing signals is also created on the same substrate as the CCD chip. The timing generator 17 generates:

(1) a read gate pulse signal φROG to be applied to a shift gate 12 for reading out signal electric charge from the sensor array 11 to the CCD shift register 13;

(2) transfer clock signals φH1 and φH2 with different phases for driving the CCD shift register 13;

(3) a reset pulse φRS for resetting the FD unit of the electric-charge detecting unit 14;

(4) a sample/hold pulse signal φSH for the sample/hold circuit 21 employed in the signal processing unit 15; and (5) a clamp pulse signal φCLP0 based on the read gate pulse signal φROG.

The generation of the signals described above is based on the read gate signal φROG and a master clock signal φclk supplied by an external source. The timing generator 17 also generates a final clamp pulse signal φCLP based on the read gate pulse signal φROG and the transfer clock signal φH1.

The timing with which the clamp pulses φCLP are generated by the timing generator 17 is a characterizing feature offered by the present invention. Characterizing features of a first embodiment provided by the present invention are explained by referring to timing charts shown in FIG. 3 as follows. It should be noted that the timing charts shown in FIG. 3 are typical timing charts showing a picture element sequence in a unit cycle which comprises three picture elements of the empty transmission unit 13a, four picture elements of the first OPB unit 11b, typically 2,048 image sensing picture elements, two picture elements of the second OPB unit 11a and three picture elements of the empty transmission unit 13a if the picture element sequence is seen to start from the falling edge of the read pulse φROG.

Figure 3:
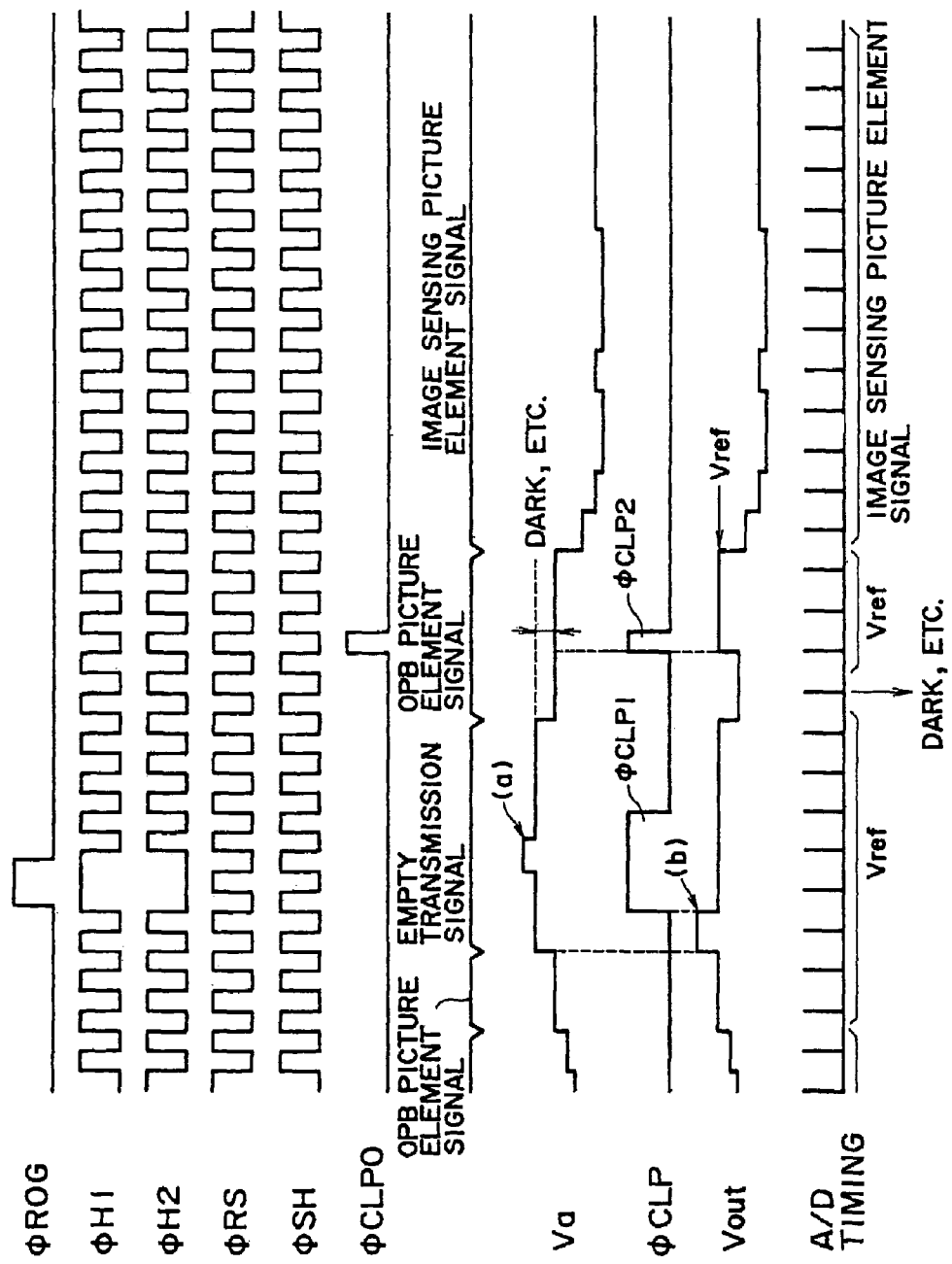
FIG. 3 shows timing charts used for explaining the operations of a first embodiment provided by the present invention.

In addition, the timing charts of FIG. 3 also show the sample/hold signal Va output by the sample/hold circuit 21, the clamped signal Vout output by the clamp circuit 22 and A/D timing pulses of the A/D converter 16 besides the various timing signals φROG, φH1, φH2, φRS, φSH, φCLP0 and φCLP described above.

The timing generator 17 employed in the first embodiment generates not only the clamp pulses φCLP2 for clamping a signal output by the first OPB unit 11b, one of signals output by the linear sensors, but also the clamp pulses φCLP1 also for clamping a signal output by the empty transmission unit 13a of the CCD shift register 13. In particular, the clamp pulses φCLP1 are generated with timing for clamping the signal output by the empty transmission unit 13a of the CCD shift register 13 over a period of time covering an inhibit period of the transfer clocks φH1 and φH2. On the other hand, the clamp pulses φCLP2 are generated with timing for clamping a portion of the signal output by the first OPB unit 11b which portion includes the second picture element or a subsequent one.

Figure 4:
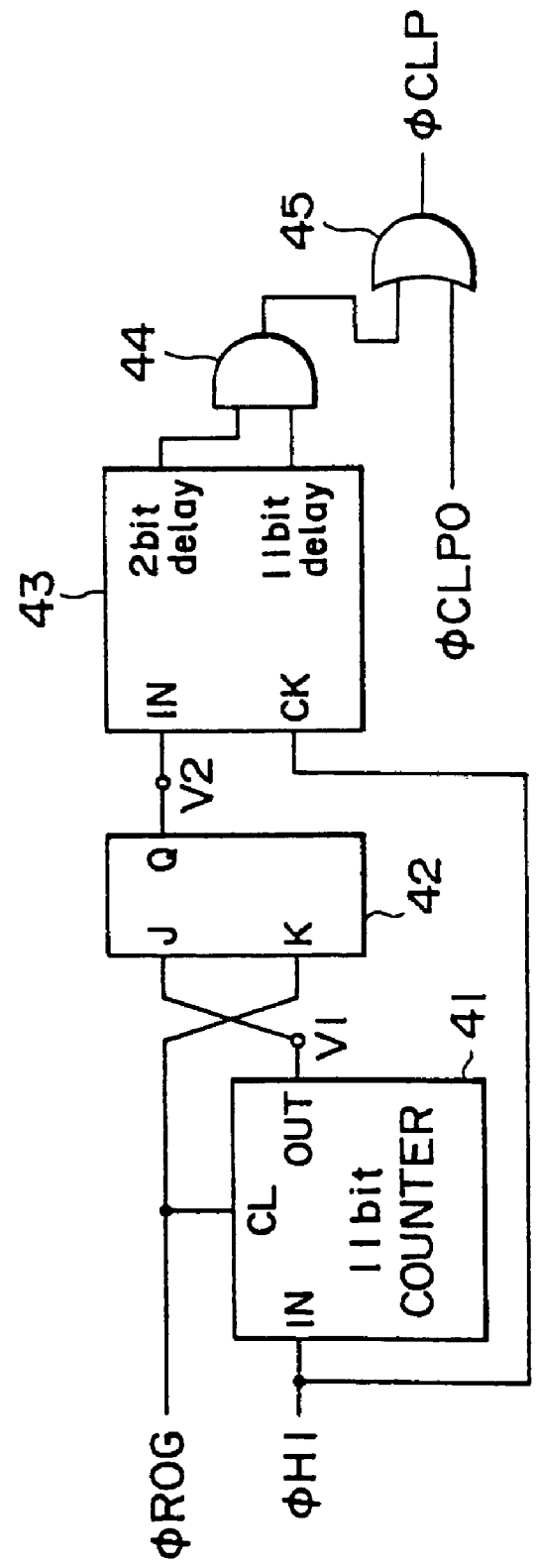
FIG. 4 is a block diagram showing a typical clamp-pulse generating circuit implemented by the first embodiment.
Figure 5:
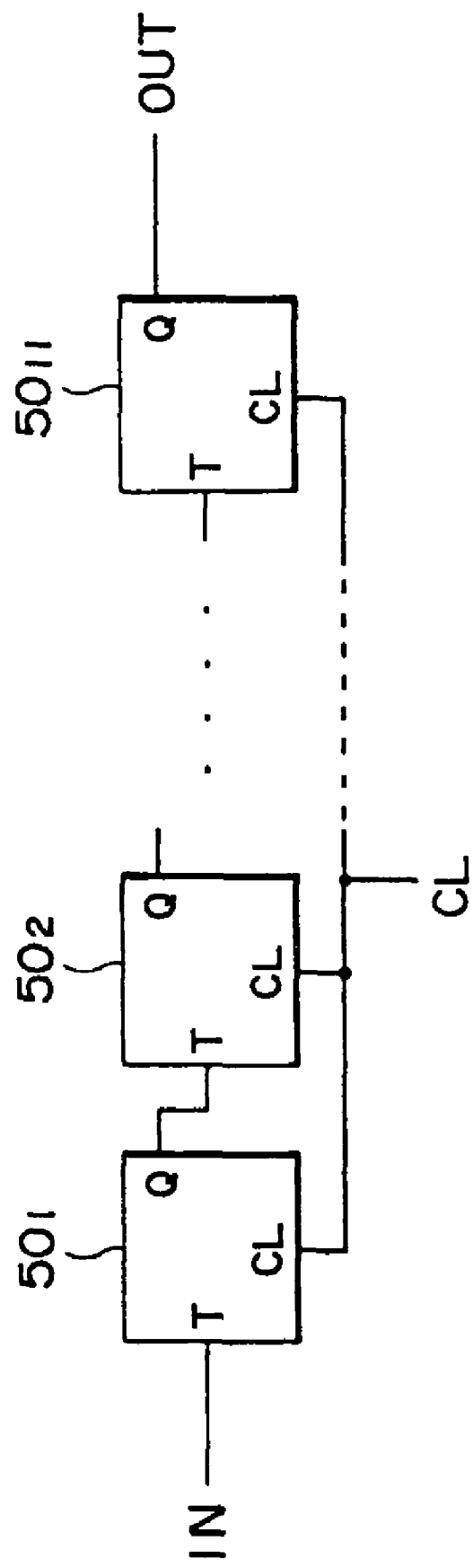
FIG. 5 is a block diagram showing a typical 11-bit counter.

FIG. 4 is a block diagram showing a typical clamp-pulse generating circuit embedded in the timing generator 17 as is implemented by the first embodiment. As shown in the figure, the clamp-pulse generating circuit comprises an 11-bit counter 41, a JK flip-flop 42, a shift register 43, an AND circuit 44 and an OR circuit 45. Receiving the read gate pulse φROG as a CL (clear) input, the 11-bit counter 41 counts the number of transfer clocks φH1 supplied thereto. The JK flip-flop 42 receives a signal output by the 11-bit counter 41 as a J input and the read gate pulse φROG as a K input. Receiving a Q output signal V2 of the JK flip-flop 42 and the transfer clock signal φH1 as a CK (clock) input V2, the shift register 43 supplies a 2-bit delay output and an 11-bit delay output to the AND circuit 44. The OR circuit 45 receives a signal output by the AND circuit 44 and the clamp pulse signal φCLP0. Details of the 11-bit counter 41 are shown in FIG. 5. As shown in the figure, the 11-bit counter 11 comprises eleven T flip-flops 501 to 5011 which are connected to each other.

Figure 6:
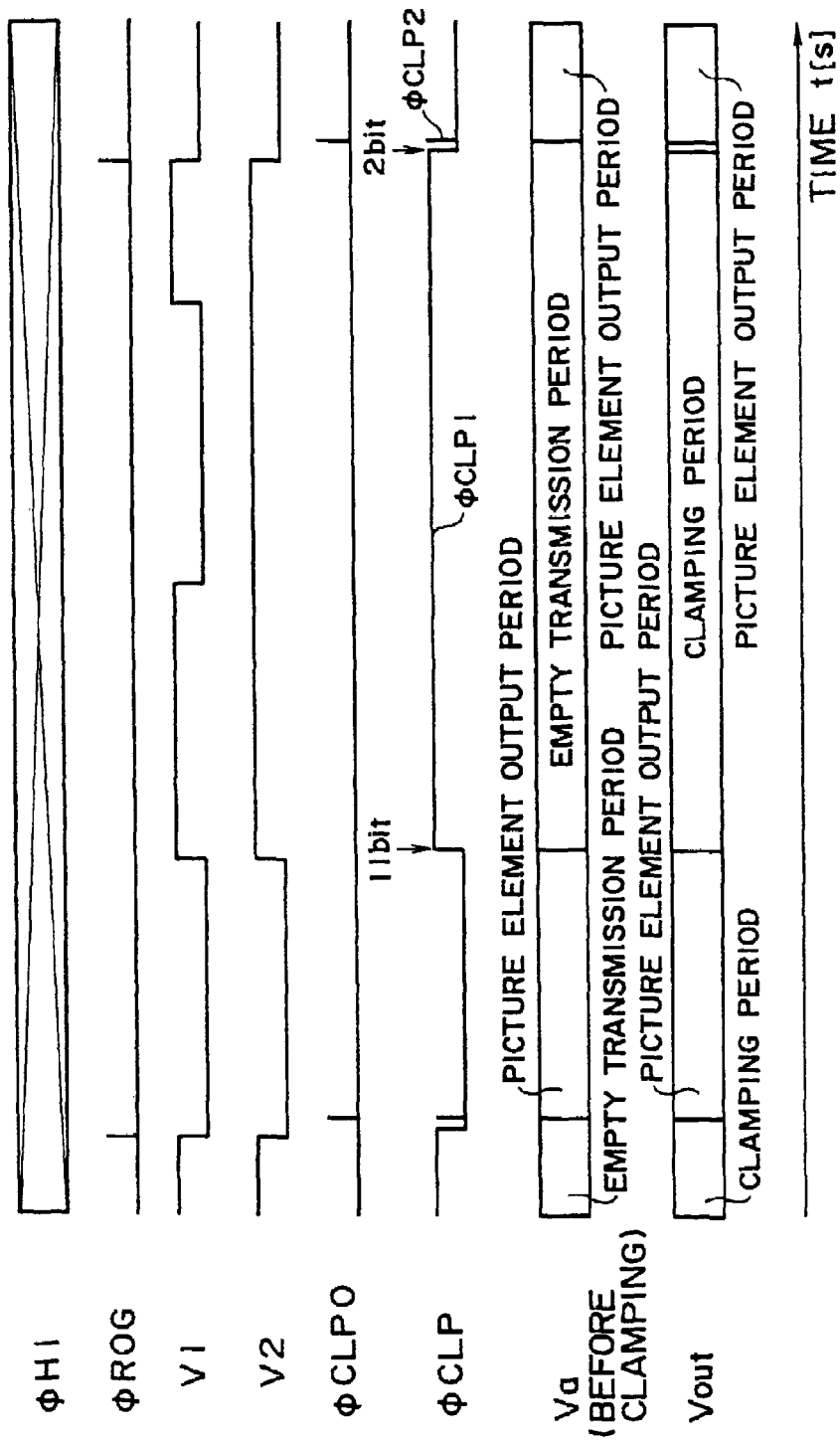
FIG. 6 shows timing charts used for explaining the operations of the clamp-pulse generating circuit shown in FIG. 4.

Next, operations of the clamp-pulse generating circuit having a configuration described above are explained by referring to timing charts shown in FIG. 6 as follows. It should be noted that notations V1 and V2 shown in FIG. 6 denote the signal output by the 11-bit counter 41 and the Q output of the JK flip-flop 42 respectively. The 11-bit counter 41 shown in FIG. 4 is cleared by the read gate pulse φROG. Every time a transfer clock φH1 is counted by the 11-bit counter 41, the polarity of the output V1 thereof is inverted. The JK flip-flop 42 is set with timing determined by the rising edge of the output V1 of the 11-bit counter 41 to an "H" level and reset by the read gate pulse φROG supplied thereto. As a result, the Q output of the JK flip-flop 42 is sustained at an "H" level over a period of time between the rising edge of the output V1 after a reset and the next reset.

The Q output V2 of the JK flip-flop 42 is delayed by the shift register 43 by 2 bits and then further delayed by 11 bits. The two delayed outputs of the shift register 43 are supplied to the AND circuit 44 for producing a logical product of the two delayed outputs. The logical product produced by the AND circuit 44 and a clamp pulse φCLP0 are supplied to the OR circuit 45 for producing a logical sum thereof which sum serves as a clamp pulse φCLP comprising the clamp pulses φCLP1 and φCLP2 described above.

Then, the clamp pulse signal φCLP is supplied to the clamp circuit 22 shown in FIG. 2. In response to a clamp pulse φCLP1, seen in FIG. 6, the clamp circuit 22 clamps the sample/hold output Va for the empty transmission unit 13a to the clamp level Vref over a period of time covering an inhibit period of the transfer clocks φH1 and φH2. In addition, in response to a clamp pulse φCLP2, the clamp circuit 22 clamps the sample/hold output Va to the clamp level Vref for the second picture element or a subsequent first OPB unit 11b.

As described above, not only is the sample/hold output Va of the first OPB unit 11b is clamped to the clamp level Vref, but the sample/hold output Va for the empty transmission unit 13a is also clamped to the clamp level Vref over a period of time covering an inhibit period of the transfer clocks φH1 and φH2. As a result, even if the sample/hold output Va reaches a maximum potential accompanying a transfer suspension caused by inhibition of the transfer clock signals φH1 and φH2 as shown in the timing charts of FIG. 3, the high signal voltage (a) is clamped in response to the clamp pulse φCLP1 to mask out the excessive portion, preventing the high signal voltage (a) from being supplied as it is to the A/D converter 16.

In addition, by clamping the sample/hold output Va for the second picture element or a subsequent first OPB unit 11b in response to a clamp pulse φCLP2, the sample/hold output Va for the first picture element of the first OPB unit 11b can be detected. As a result, the level of a dark component such as a dark current and the like can be detected from the sample/hold output Va for the first picture element.

As described above, in the case of the first embodiment, the high signal voltage (a) accompanying transfer suspension can be prevented from being supplied to the A/D converter 16. It should be noted, however, that a signal voltage (b) higher than the reference signal Vref accompanying a dark component and the like observed in the empty transmission unit 13a prior to the transfer suspension is input to the A/D converter 16. None the less, the high signal voltage (a) accompanying transfer suspension has a potential higher than the signal voltage (b) accompanying a dark current and the like. As a result, by merely preventing the high signal voltage (a) accompanying transfer suspension, rather than the signal voltage (b), from being supplied to the A/D converter 16, an object of the present invention to reduce the possibility of damaging the A/D converter 16 can be attained properly to a certain degree as expected.

Figure 7:
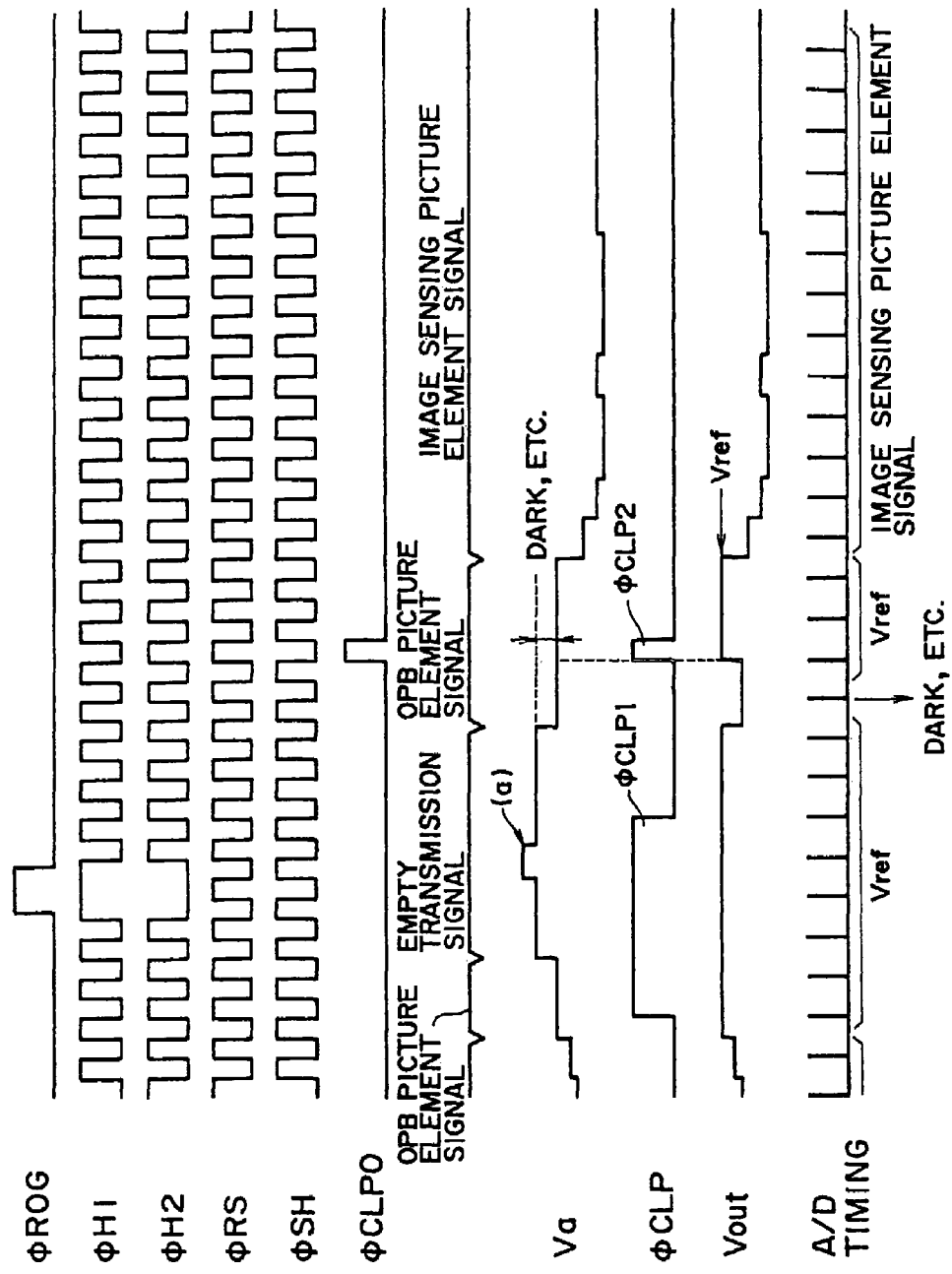
FIG. 7 shows timing charts used for explaining the operations of a second embodiment provided by the present invention.

Next, a second embodiment provided by the present invention is explained by referring to timing charts shown in FIG. 7. It should be noted that a picture element sequence shown in FIG. 7 is the same as the one shown in FIG. 3.

In the case of the second embodiment, the timing generator 17 generates clock signals for clamping some of signals output by the linear sensors. To be more specific, the timing generator 17 generates the clamp pulse signal φCLP2 for clamping a signal output by the first OPB unit 11b and the clamp pulse signal φCLP1 for clamping not only a signal output by the empty transmission unit 13a but also a signal output by the second OPB unit 11a. In particular, the clamp pulses φCLP1 are generated for clamping the signals over a period of time between a halfway point of time in a signal output by the second OPB unit 11a and the end of an inhibit period of transfer clocks φH1 and φH2 for a signal output by the empty transmission unit 13a of the CCD shift register 13. Much like the first embodiment, the clamp pulse signal φCLP2 is generated with timing to clamp a portion of a signal output by the first OPB unit 11b which portion represents the second picture element or a subsequent one.

Figure 8:
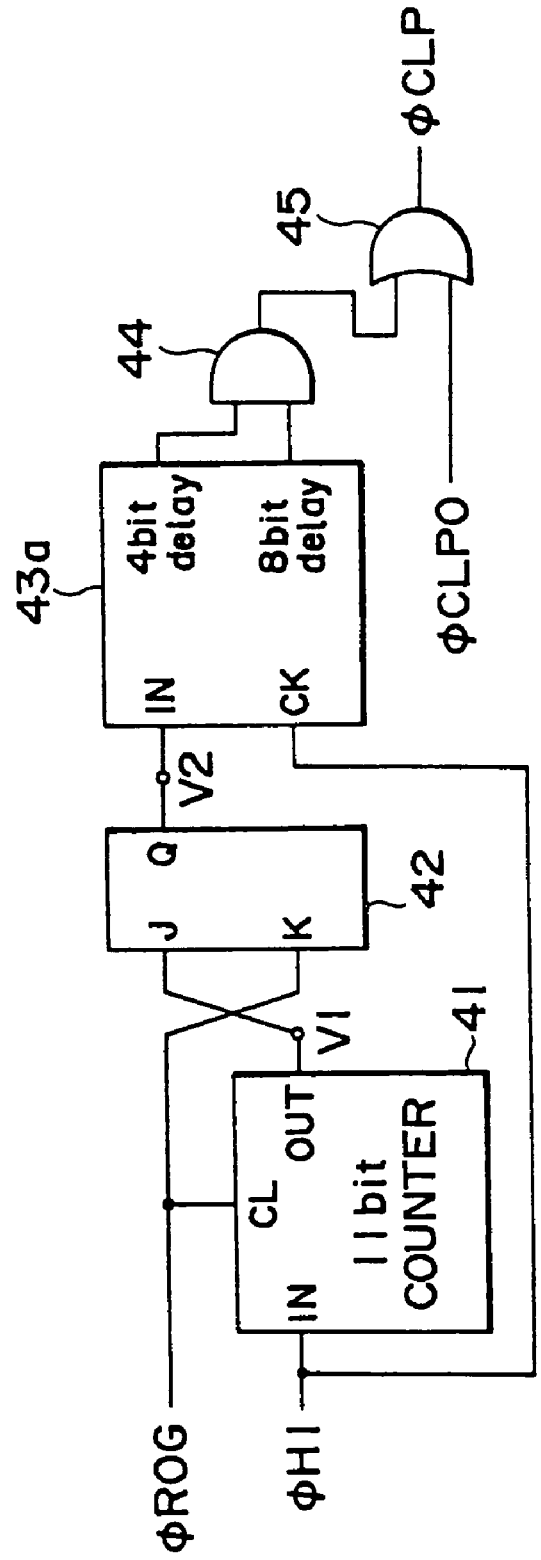
FIG. 8 is a block diagram showing a typical clamp-pulse generating circuit implemented by the second embodiment.
Figure 9:
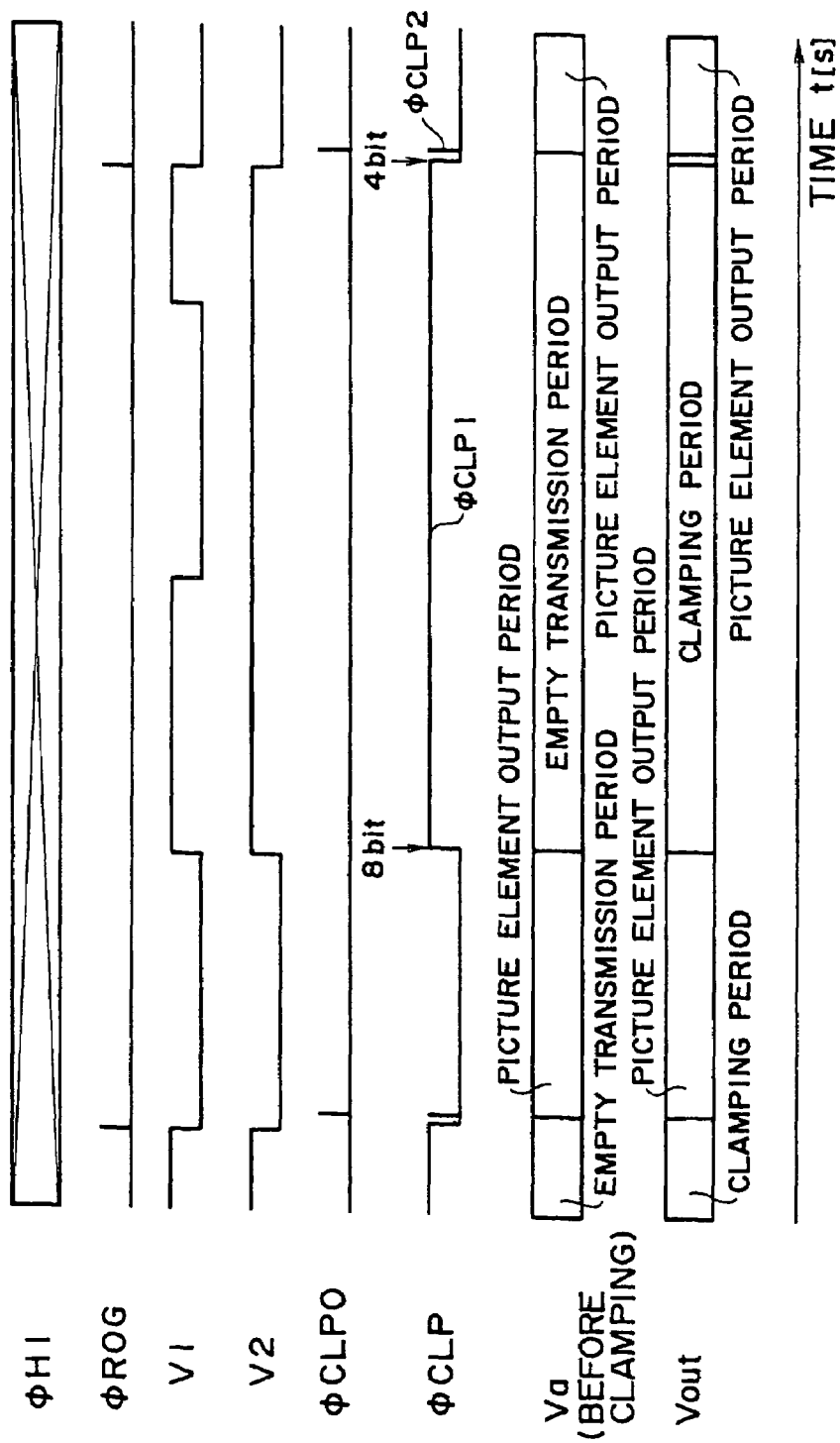
FIG. 9 shows timing charts used for explaining the operations of the clamp-pulse generating circuit shown in FIG. 8.

FIG. 8 is a block diagram showing a typical clamp-pulse generating circuit embedded in the timing generator 17 as is implemented by the second embodiment. It should be noted that the same notations and reference numerals as those shown in FIG. 4 are used in FIG. 8 for denoting components identical with those shown in FIG. 4. The clamp-pulse generating circuit implemented by the second embodiment basically has the same circuit configuration as the clamp-pulse generating circuit implemented by the first embodiment. The only difference is that the Q output V2 of the JK flip-flop 42 is delayed by a shift register 43a by four bits and then further delayed by eight bits. Timing charts of signals appearing at a variety of locations in the clamp-pulse generating circuit are shown in FIG. 9.

As described above, in the clamp-pulse generating circuit implemented by the second embodiment, the Q output V2 of the JK flip-flop 42 is delayed by the shift register 43a by four bits and then further delayed by eight bits. The two delayed outputs of the shift register 43a are supplied to the AND circuit 44 for producing a logical product of the two delayed outputs. The logical product produced by the AND circuit 44 and a clamp pulse φCLP0 are supplied to the OR circuit 45 for producing a logical sum thereof which sum serves as a clamp pulse φCLP comprising the clamp pulses φCLP1 and φCLP2 described above.

Then, the clamp pulse signal φCLP is supplied to the clamp circuit 22 shown in FIG. 2. In response to a clamp pulse φCLP1, the clamp circuit 22 clamps the sample/hold output Va to the clamp level Vref over a period of time between a halfway point of time of a signal output by the OPB unit 11a on the front side and the end of an inhibit period of the transfer clocks φH1 and φH2 for a signal output by the empty transmission unit 13a. In addition, in response to a clamp pulse φCLP2, the clamp circuit 22 clamps the sample/hold output Va to the clamp level Vref for the second picture element or a subsequent one of the OPB unit 11b on the rear side.

As described above, the clamp circuit 22 clamps the sample/hold output Va to the clamp level Vref over a period of time between a halfway point of time of a signal output by the OPB unit 11a on the front side and the end of an inhibit period of the transfer clocks φH1 and φH2 for a signal output by the empty transmission unit 13a. As a result, much like the first embodiment, the high signal voltage (a) accompanying transfer suspension caused by inhibition of the transfer clock signals φH1 and φH2 is prevented from being supplied as it is to the A/D converter 16. Moreover, it also possible not to supply a signal voltage of the empty transmission unit 13a higher than the reference voltage Vref caused by a dark current or the like to the A/D converter 16 at all, allowing the problems encountered in the first embodiment to be solved.

In addition, by clamping the sample/hold output Va for the second picture element or a subsequent one of the OPB unit 11a in response to a clamp pulse φCLP2, the sample/hold output Va for the first picture element of the OPB unit 11a can be detected. As a result, the level of a dark component such as a dark current and the like can be detected from the sample/hold output Va for the first picture element as is the case with the first embodiment.

In the case of this embodiment, the clamp pulses φCLP1 are generated over a period of time between a halfway point of time of a signal output by the second OPB unit 11a on the end of an inhibit period of the transfer clocks φH1 and φH2 for a signal output by the empty transmission unit 13a. It should be noted, however, that the clamp pulses φCLP1 can also be generated over a period of time between a halfway point of time of a signal output by the OPB unit 11a on the front side and a halfway point of time of a signal output by the empty transmission unit 13a, for example, at a point before an inhibit period of the transfer clocks φH1 and φH2 for the empty transmission unit 13a. In such a case, the high signal voltage (a) accompanying transfer suspension can not be prevented from being supplied to the A/D converter 16. It should be noted, however, that a signal voltage (b) higher than the reference signal Vref accompanying a dark current and the like observed in the empty transmission unit 13a can be prevented from being input to the A/D converter 16 without modifying the sampling timing of the A/D converter 16 which is implemented as an external circuit.

Figure 10:
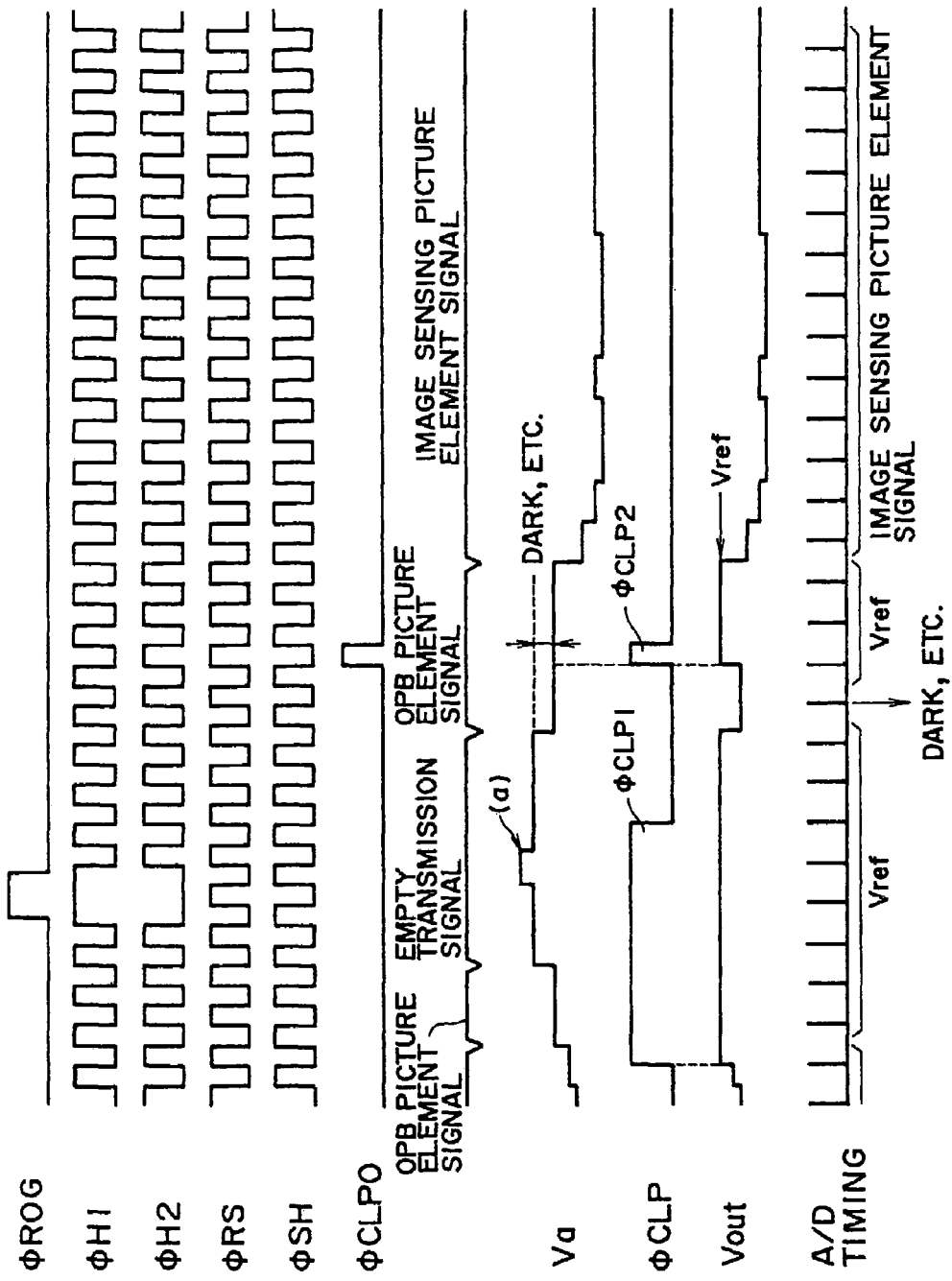
FIG. 10 shows timing charts used for explaining the operations of a third embodiment provided by the present invention.

Next, a third embodiment provided by the present invention is explained by referring to timing charts shown FIG. 10. It should be noted that the same notations and reference numerals as those shown in FIG. 3 are used in FIG. 10 for denoting components identical with those shown in FIG. 3.

In the case of the third embodiment, the timing generator 17 generates clock signals for clamping some of signals output by the linear sensors. To be more specific, the timing generator 17 generates the clamp pulses φCLP2 for clamping not only a signal output by the first OPB unit 11b and the clamp pulses φCLP1 for clamping a signal output by the second OPB unit 11a preceding ahead by one cycle and a signal output by the empty transmission unit 13a of the CCD shift register 13, but also a portion of a signal of the last picture element of an image sensing picture element signal portion preceding ahead by one line. In particular, the clamp pulses φCLP1 are generated with timing to clamp a signal over a period of time between a halfway point of time in a signal of the last picture element preceding ahead by one line and the end of an inhibit period of the transfer clocks φH1 and φH2 for a signal output by the empty transmission unit 13a. Much like the first and second embodiments, the clamp pulse signal φCLP2 is generated with timing to clamp a portion of a signal output by the first OPB unit 11b on the rear side of the sensor array 11 which portion represents the second picture element or a subsequent one.

Figure 11:
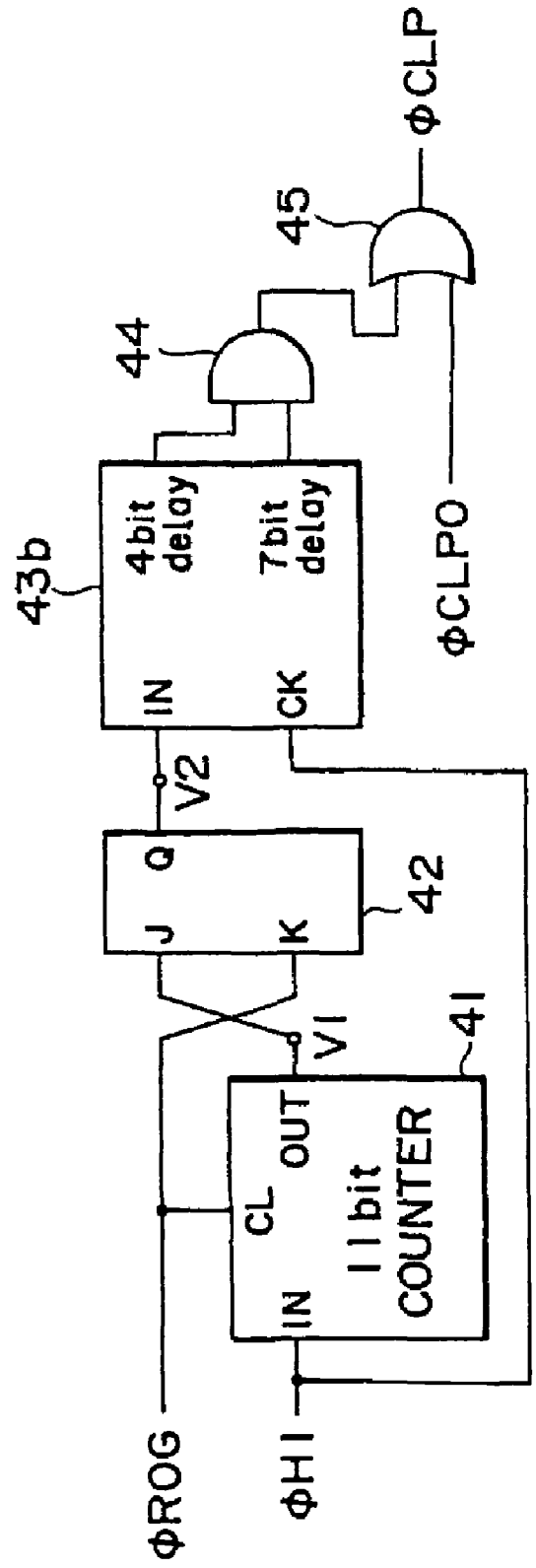
FIG. 11 is a block diagram showing a typical clamp-pulse generating circuit implemented by the third embodiment.
Figure 12:
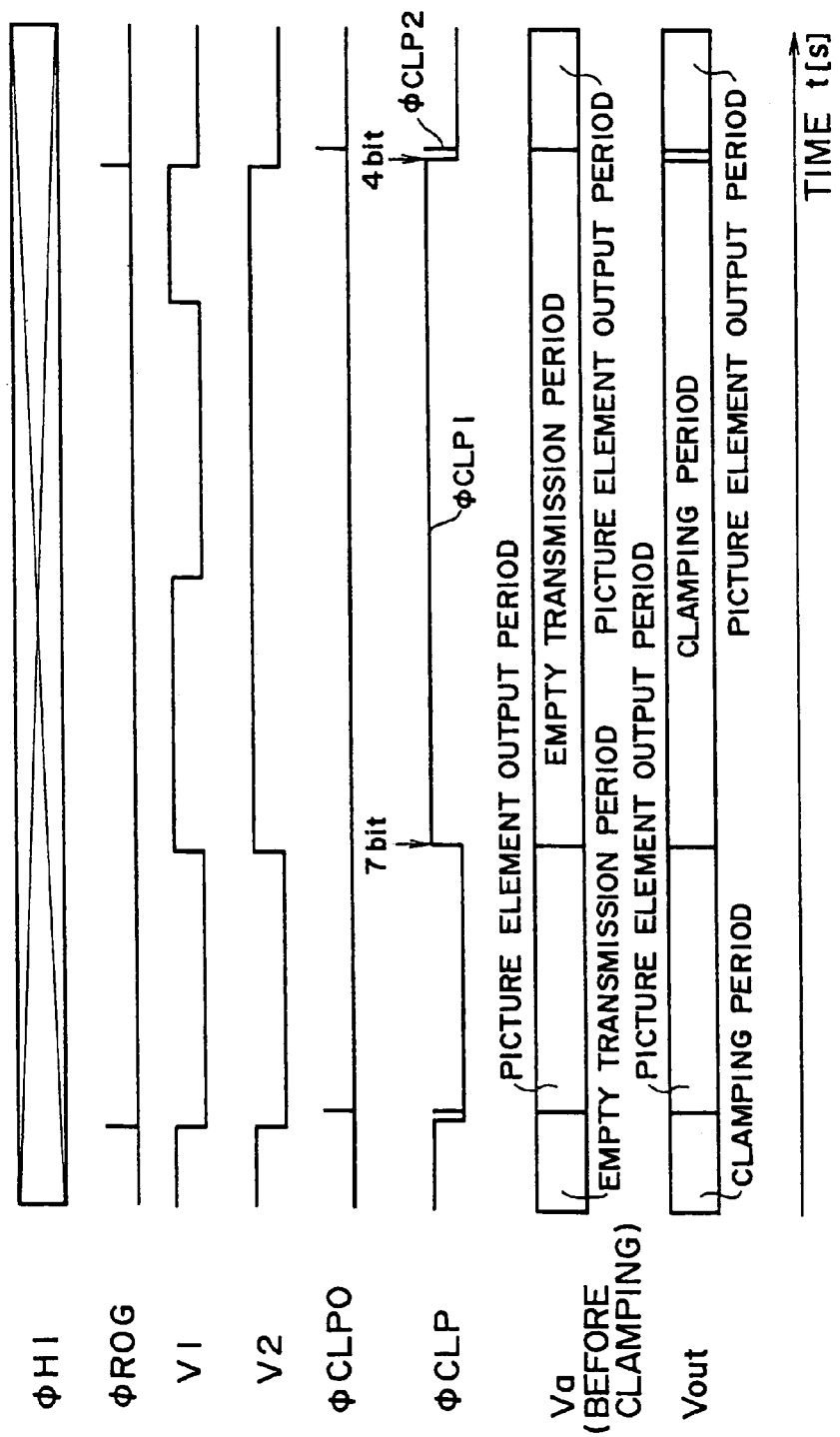
FIG. 12 shows timing charts used for explaining the operations of the clamp-pulse generating circuit shown in FIG. 11.

FIG. 11 is a block diagram showing a typical clamp-pulse generating circuit embedded in the timing generator 17 as is implemented by the third embodiment. It should be noted that the same notations and reference numerals as those shown in FIG. 4 are used in FIG. 11 for denoting components identical with those shown in FIG. 4. The clamp-pulse generating circuit implemented by the third embodiment basically has the same circuit configuration as the clamp-pulse generating circuit implemented by the first embodiment. The only difference is that the Q output V2 of the JK flip-flop 42 is delayed by a shift register 43b by four bits and then further delayed by seven bits. Timing charts of signals appearing at a variety of locations in the clamp-pulse generating circuit are shown in FIG. 12.

As described above, in the clamp-pulse generating circuit implemented by the third embodiment, the Q output V2 of the JK flip-flop 42 is delayed by the shift register 43b by four bits and then further delayed by seven bits. The two delayed outputs of the shift register 43b are supplied to the AND circuit 44 for producing a logical product of the two delayed outputs. The logical product produced by the AND circuit 44 and a clamp pulse φCLP0 are supplied to the OR circuit 45 for producing a logical sum thereof which sum serves as a clamp pulse φCLP comprising the clamp pulses φCLP1 and φCLP2 described above.

Then, the clamp pulse signal φCLP is supplied to the clamp circuit 22 shown in FIG. 2. In response to a clamp pulse φCLP1, the clamp circuit 22 clamps the sample/hold output Va to the clamp level Vref over a period of time between a halfway point of time of a signal of the last picture element preceding ahead by one line and the end of an inhibit period of the transfer clocks φH1 and φH2 for a signal output by the empty transmission unit 13a. In addition, in response to a clamp pulse φCLP2, the clamp circuit 22 clamps the sample/hold output Va to the clamp level Vref for the second picture element or a subsequent one of the OPB units 11b.

As described above, the sample/hold output Va is clamped to the clamp level Vref over a period of time between a halfway point of time of a signal of the last picture element preceding ahead by one line and the end of an inhibit period of the transfer clocks φH1 and φH2 for a signal output by the empty transmission unit 13a. As a result, much like the first embodiment, the high signal voltage (a) accompanying a transfer suspension caused by inhibition of the transfer clock signals φH1 and φH2 is prevented from being supplied as it is to the A/D converter 16. On the top of that, much like the second embodiment, it is also possible to halt completely the supplying of a signal voltage of the empty transmission unit 13a higher than the reference voltage Vref caused by a dark current or the like to the A/D converter 16. In addition, in the case of the third embodiment, the following effects are obtained.

That is to say, by clamping the sample/hold output Va to the clamp level Vref for the second picture element or a subsequent one of the first OPB unit 11b in response to a clamp pulse φCLP2, much like the first and second embodiments, the sample/hold output Va for the first picture element of the first OPB unit 11b can be detected. As a result, the level of a dark component such as a dark current and the like can be detected from the sample/hold output Va for the first picture element. If there is a difference in signal level between the OPB units 11a and 11b and the signal level of the second OPB units is higher than of that of the first OPB units, a signal voltage higher than the reference potential Vref by the signal-level difference is supplied to the A/D converter 16 only if the sample/hold signal Va of the first OPB unit 11b is clamped.

By clamping a signal from a halfway point of time of the signal for the last picture element preceding ahead by one line as is the case with the third embodiment, the clamping of a high signal voltage of the second OPB unit 11a in accordance with the clamp pulse φCLP1 allows the high signal to be masked out. As a result, even if there is a difference in signal level between the second OPB units 11a and first OPB units 11b on the rear side, the problem described above can be solved. That is to say, a signal voltage of the OPB unit 11a on the front side higher than the reference potential Vref by the signal-level difference can be prevented from being supplied to the A/D converter 16.

Figure 13:
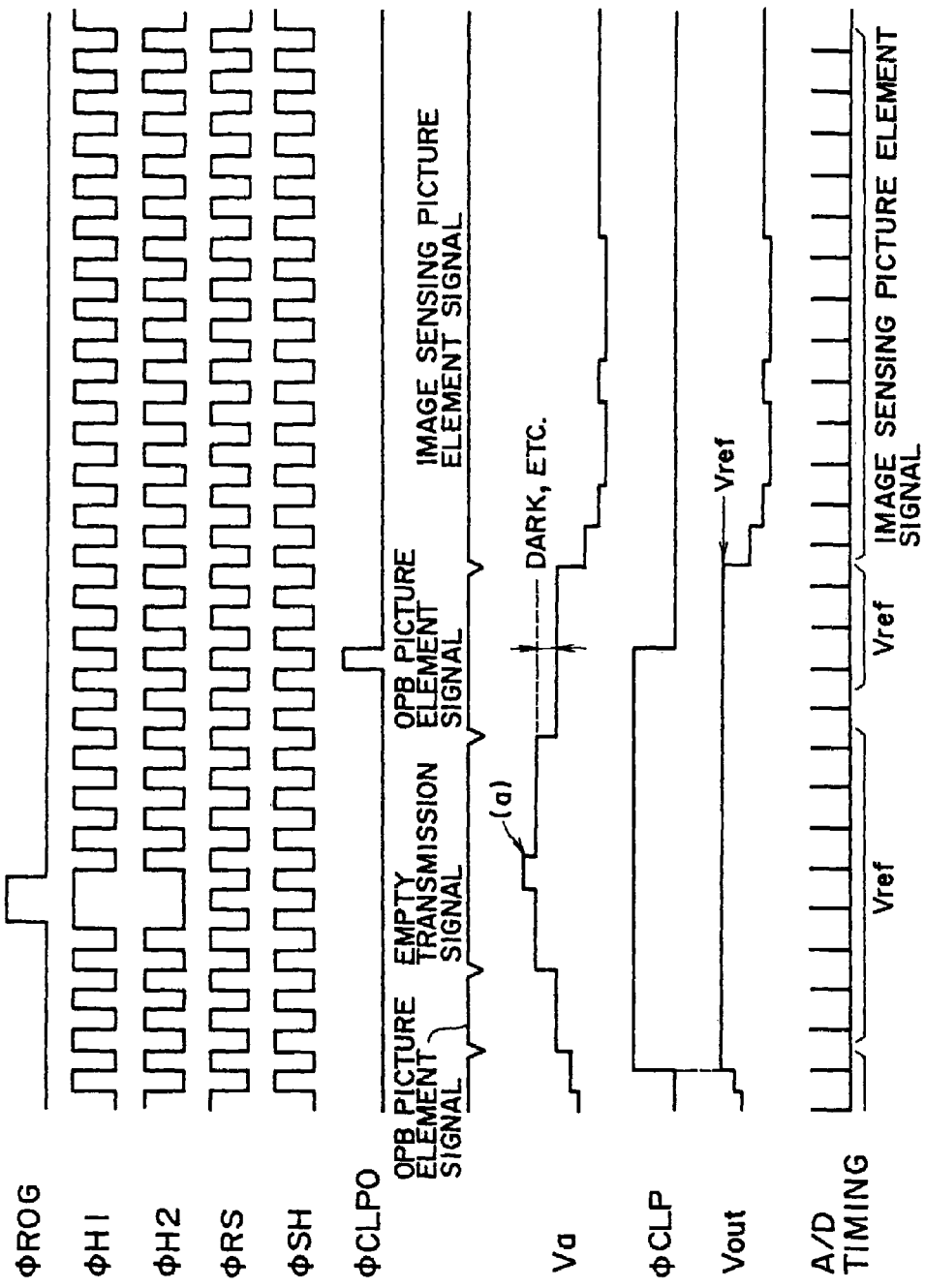
FIG. 13 shows timing charts used for explaining the operations of a fourth embodiment provided by the present invention.

It should be noted, that in the case of the first to third embodiments described above, for a solid-state image sensing device conforming to dark-level detection specifications, the clamp pulses φCLP2 for clamping the sample/hold output Va for the second picture element or a subsequent one of the first OPB units 11b are generated independently of the clamp pulse signal φCLP1. However, there are solid-state image sensing devices with no dark-level detection specifications. A fourth embodiment provided by the present invention is applicable to solid-state image sensing devices with no dark-level detection specifications. The fourth embodiment is explained by referring to timing charts shown in FIG. 13.

The timing generator 17 of the fourth embodiment generates a single contiguous pulse over a period of time between a halfway point of time in a signal of the last picture element preceding ahead by one line and the second picture element of a signal output by the first OPB unit 11b on the rear side as a clamp pulse φCLP. This is because, since detection of a dark level is not necessary, the clamp pulses φCLP2 required by the first to third embodiments for clamping the signal output by the OPB unit 11b on the rear side do not have to be generated independently of the clamp pulses φCLP1.

Figure 14:
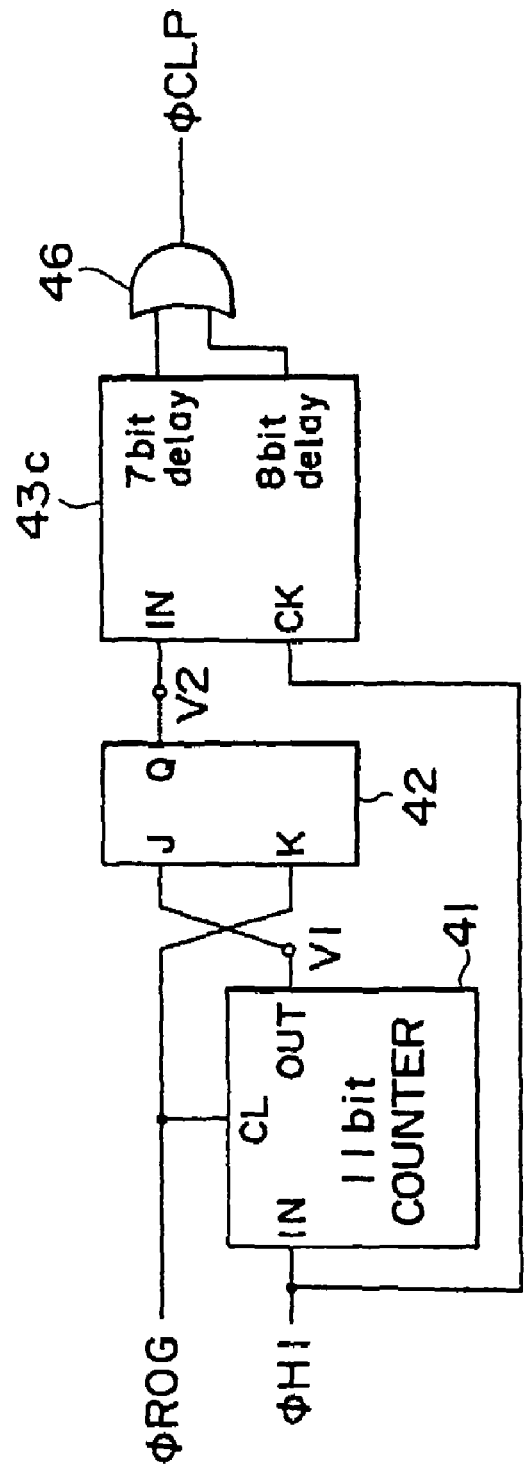
FIG. 14 is a block diagram showing a typical clamp-pulse generating circuit implemented by the fourth embodiment.
Figure 15:
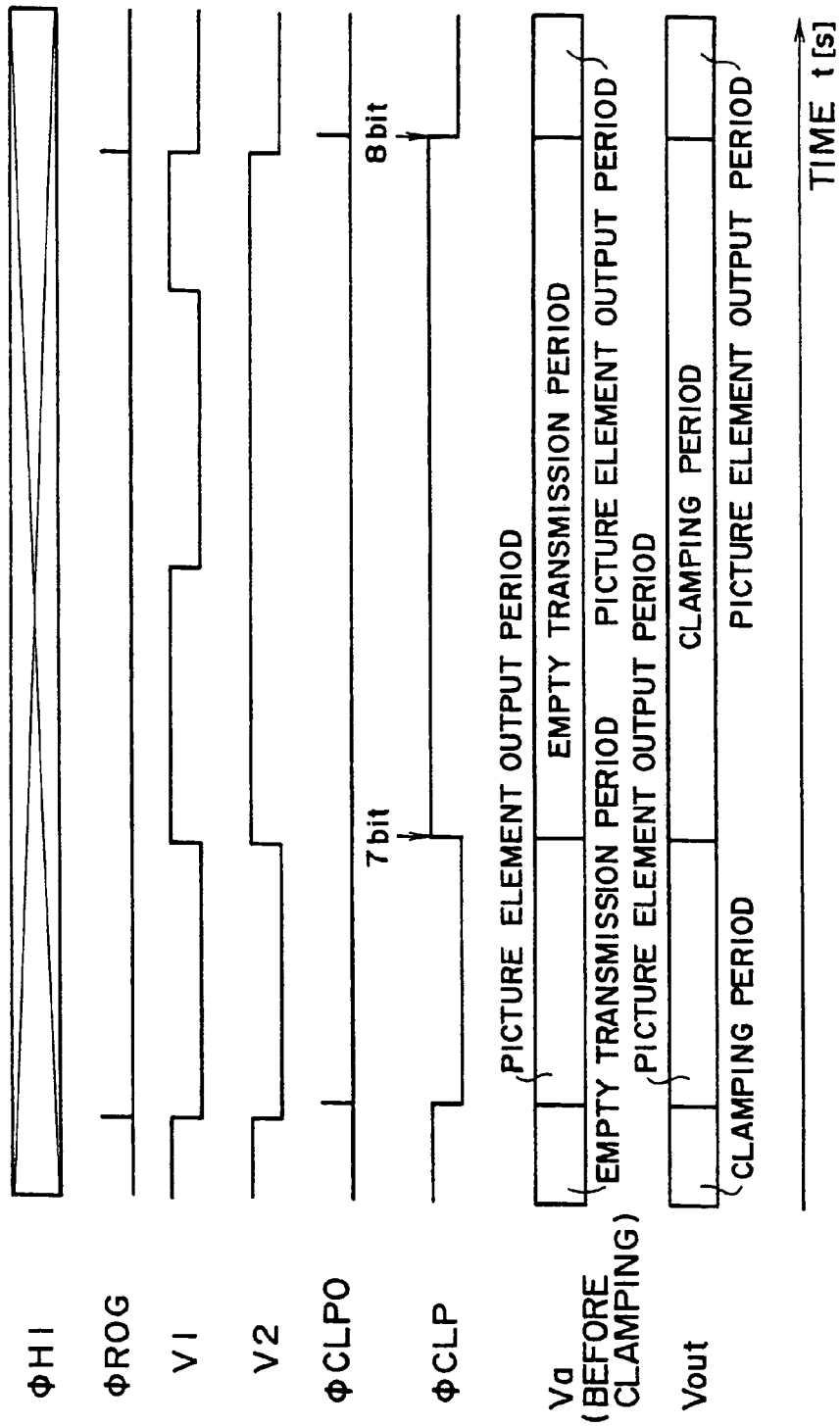
FIG. 15 shows timing charts used for explaining the operations of the clamp-pulse generating circuit shown in FIG. 14.

FIG. 14 is a block diagram showing a typical clamp-pulse generating circuit embedded in the timing generator 17 as is implemented by the fourth embodiment. It should be noted that the same notations and reference numerals as those shown in FIG. 4 are used in FIG. 14 for denoting components identical with those shown in FIG. 4. The clamp-pulse generating circuit implemented by the fourth embodiment basically has the same circuit configuration as the clamp-pulse generating circuit implemented by the first embodiment. The only difference is that the Q output V2 of the JK flip-flop 42 is delayed by a shift register 43c by seven bits and then further delayed by eight bits and the seven-bit and eight-bit delayed signals output by the shift register 43c are supplied to a two-input OR circuit 46. Timing charts of signals appearing at a variety of locations in the clamp-pulse generating circuit are shown in FIG. 15.

As described above, in the clamp-pulse generating circuit implemented by the fourth embodiment, the Q output V2 of the JK flip-flop 42 is delayed by the shift register 43c by seven bits and then further delayed by eight bits. The two delayed outputs of the shift register 43c are supplied to the OR circuit 46 for producing a logical sum of the two delayed outputs to generate a single contiguous clamp pulse φCLP over a period of time between a halfway point of time in a signal of the last picture element preceding ahead by one line and the second picture element of a signal output by the first OPB unit 11b. Then, by supplying this clamp pulse φCLP to the clamp circuit 22 shown in FIG. 2, the clamp circuit 22 clamps the sample/hold output Va to the clamp level Vref over a period of time between a halfway point of time in a signal of the last picture element preceding ahead by one line and the second picture element of a signal output by the OPB unit 11b.

By sampling the sample/hold output Va to the clamp level Vref over a period of time between a halfway point of time in a signal of the last picture element preceding ahead by one line and the second picture element of a signal output by the first OPB unit 11b as described above, entirely the same effects as those of the third embodiment are obtained except that a level caused by a dark current and the like can not be detected. That is to say, it is possible to halt the supplying of a high signal voltage accompanying a transfer suspension caused by the inhibition of the transfer clock signals φH1 and φH2 and a signal voltage higher than the reference potential Vref accompanying a dark current and the like at the empty transmission unit 13a to the A/D converter 16. Moreover, if there is a difference in signal level between the OPB units 11a on the front side and 11b on the rear side, a signal voltage higher than the reference potential Vref by the signal-level difference can be prevented from being supplied to the A/D converter 16.

In addition, in the case of the fourth embodiment, the sampling pulse φCLP is generated as a single continuous pulse extending over a period of time between a halfway point of time in a signal of the last picture element preceding ahead by one cycle and the second picture element of a signal output by the first OPB unit 11b to clamp the sample/hold output Va over the period. A gate circuit can thus be eliminated as is obvious from comparison of the circuit configuration shown in FIG. 11 with that shown in FIG. 14. As a result, the circuit configuration can be made simpler in comparison with that of the third embodiment.

As described above, in the case of the fourth embodiment, the sampling pulse φCLP is generated as a single continuous pulse extending over a period of time between a halfway point of time in a signal of the last picture element preceding ahead by one cycle and the second picture element of a signal output by the first OPB unit 11b to clamp the sample/hold output Va over the period to be compatible with the third embodiment. It should be noted, however, that the clamp pulse φCLP can also be generated as a single continuous pulse extending over a period of time between a halfway point of time in a signal output by the second OPB unit 11a and the second picture element of a signal output by the first OPB unit 11b to clamp the sample/hold output Va over the period to be compatible with the second embodiment. As an alternative, the clamp pulse φCLP can also be generated as a single continuous pulse extending over a period of time between a point of time before an inhibit period of the transfer clocks φH1 and φH2 and the second picture element of the first OPB unit 11b to clamp the sample/hold output Va over the period to be compatible with the first embodiment.

Figure 16:
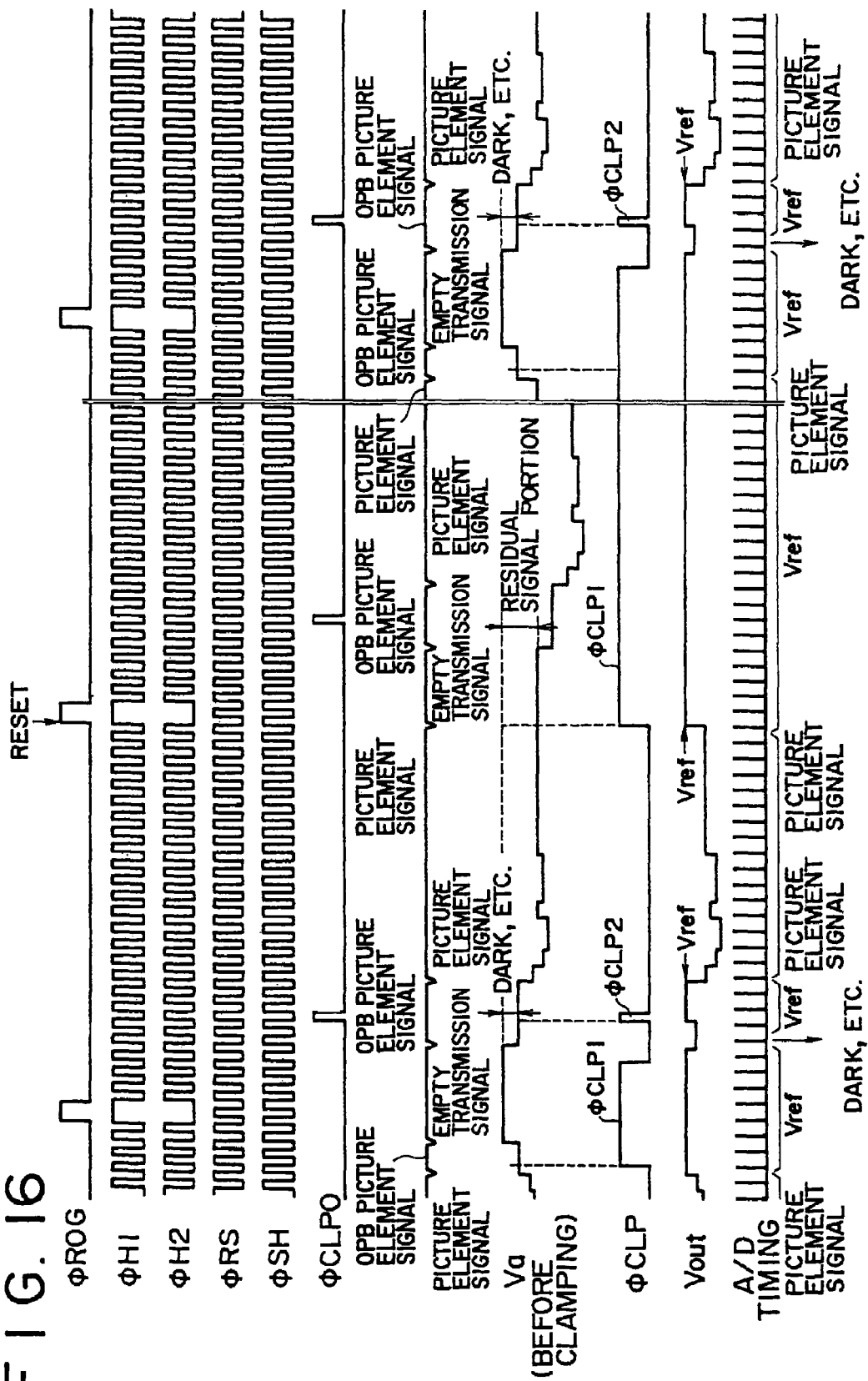
FIG. 16 shows timing charts used for explaining the operations of a fifth embodiment provided by the present invention.

Next, a fifth embodiment provided by the present invention is explained by referring to timing charts shown in FIG. 16. It should be noted that, much like the timing charts shown in FIGS. 3, 7, 10 and 13, the timing charts of FIG. 16 show a picture element sequence which comprises three picture elements of the empty transmission unit 13a, four picture elements of the first OPB unit 11b, typically 2,048 image sensing picture elements, two picture elements of the second OPB unit 11a and three picture elements of the empty transmission unit 13a if the picture element sequence is seen to start from the falling edge of the read pulse GROG.

As is the case with the second embodiment, for example, in the timing generator 17 of the fifth embodiment for generating the clamp pulse signal φCLP1 for clamping a signal over a period of time between a halfway point of time in a signal output by the second OPB unit 11b and the end of an inhibit period of the transfer clocks φH1 and φH2 for a signal output by the empty transmission unit 13a of the CCD shift register 13 and for generating the clamp pulse signal φCLP2 for clamping a portion of a signal output by the first OPB unit 11b which portion represents the second picture element or a subsequent one, when the read gate pulse φROG is raised to a high level due to a reset applied in the course of transferring signal electric charge in the CCD shift register 13 (that is, in the course of outputting a picture element signal), a clamp pulse φCLP1 is generated continuously over a period of time from typically the timing to apply the reset to a clamp period accompanying the next reset.

Figure 17:
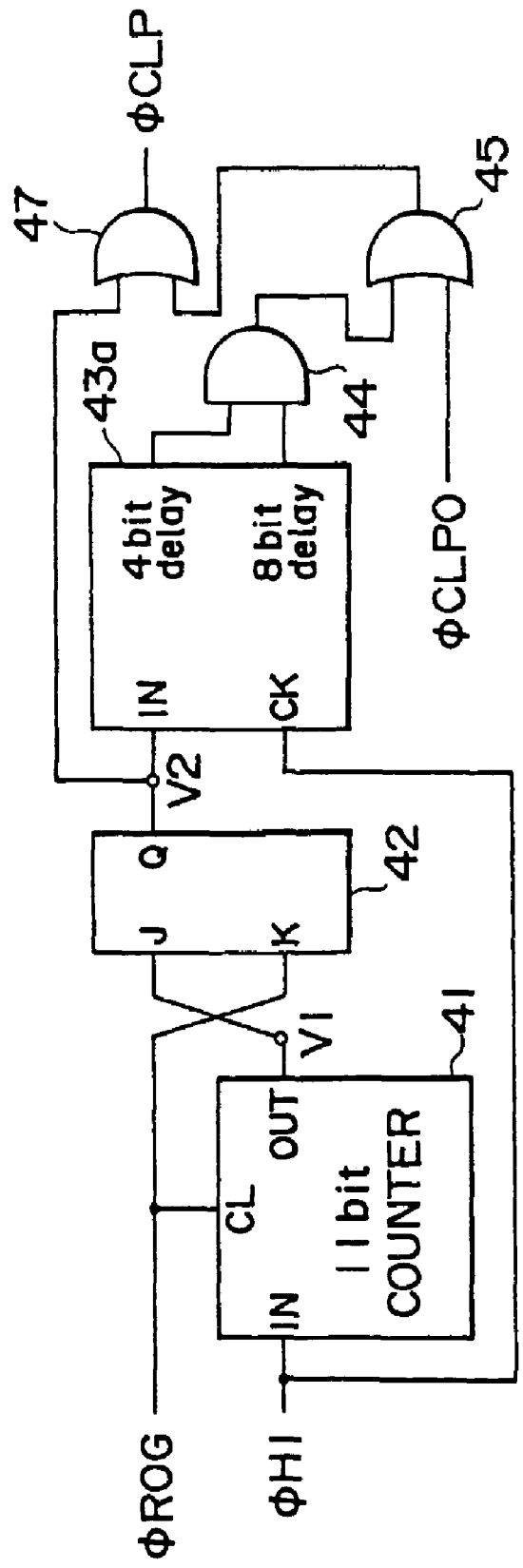
FIG. 17 is a block diagram showing a typical clamp-pulse generating circuit implemented by the fifth embodiment.
Figure 18:
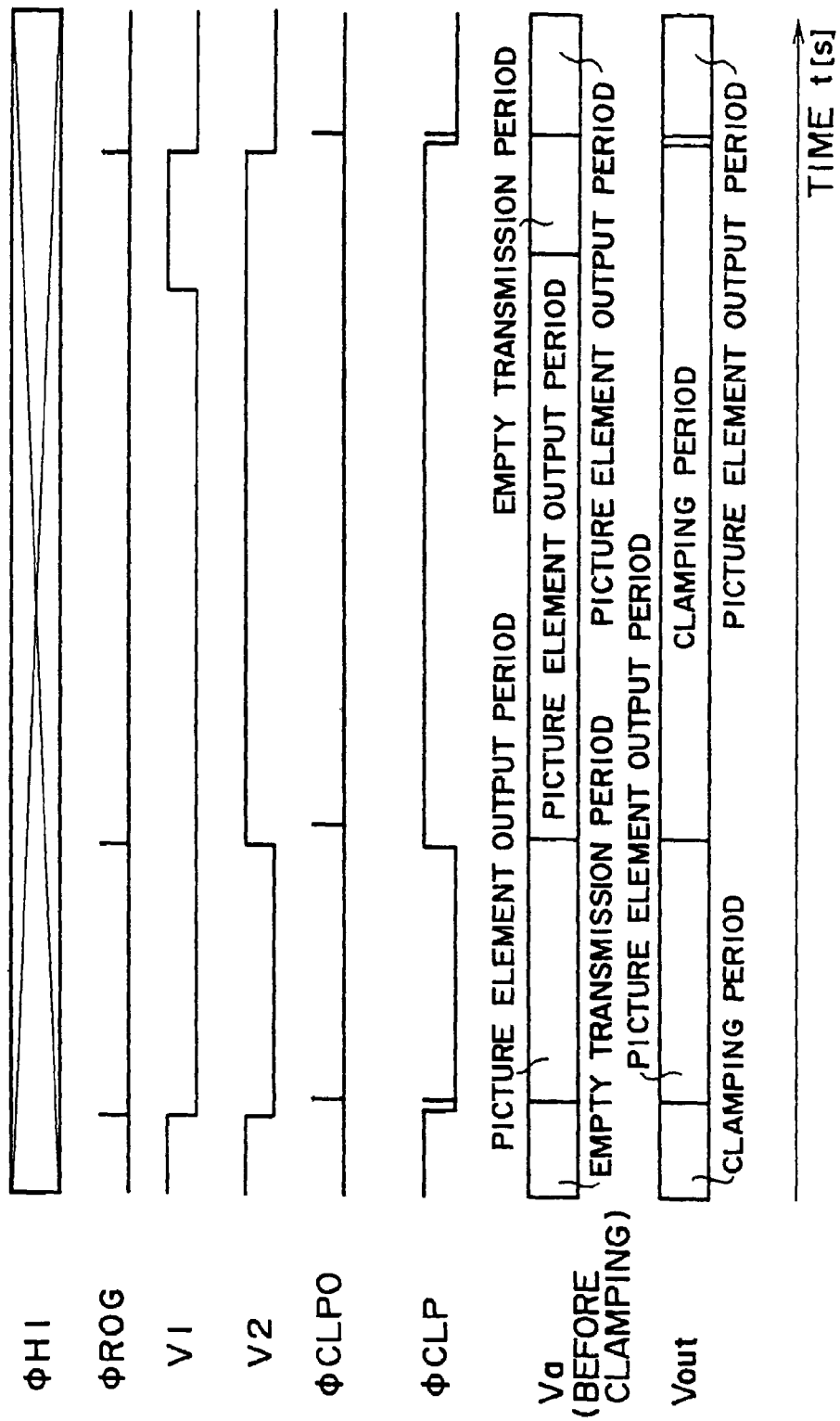
FIG. 18 shows timing charts used for explaining the operations of the clamp-pulse generating circuit shown in FIG. 17.

FIG. 17 is a block diagram showing a typical clamp-pulse generating circuit embedded in the timing generator 17 as is implemented by the fifth embodiment. It should be noted that the same notations and reference numerals as those used in the second embodiment shown in FIG. 8 are used in FIG. 17 for denoting components identical with those shown in FIG. 8. The clamp-pulse generating circuit implemented by the fifth embodiment basically has the same circuit configuration as the clamp-pulse generating circuit implemented by the second embodiment. That is to say, also in the case of the fifth embodiment, the Q output V2 of the JK flip-flop 42 is delayed by the shift register 43a by four bits and then further delayed by eight bits. The two 4-bit and 8-bit delayed outputs of the shift register 43 are supplied to the AND circuit 44 for producing a logical product of the two delayed outputs. The logical product produced by the AND circuit 44 and a clamp pulse φCLP0 are supplied to the OR circuit 45 for producing a logical sum thereof. Furthermore, the output of the OR circuit 45 and the Q output V2 of the JK flip-flop 42 are supplied to a two-input OR circuit 47. Timing charts of signals appearing at a variety of locations in the clamp-pulse generating circuit are shown in FIG. 18.

As described above, in the fifth embodiment, the Q output V2 of the JK flip-flop 42 is delayed by the shift register 43a by four bits and then further delayed by eight bits. The two 4-bit and 8-bit delayed outputs of the shift register 43 are supplied to the AND circuit 44 for producing a logical product of the two delayed outputs. The logical product produced by the AND circuit 44 and a clamp pulse φCLP0 are supplied to the OR circuit 45 for producing a logical sum thereof. Furthermore, the output of the OR circuit 45 and the Q output V2 of the JK flip-flop 42 are supplied to a two-input OR circuit 47. As a result, when a reset is applied in the course of transferring signal electric charge in the CCD shift register 13, a clamp pulse φCLP is generated which clamp pulse φCLP includes a "H" level clamp pulse φCLP1 continuously over a period of time from the timing to apply the reset to a clamp period accompanying the next reset.

Then, with the clamp pulse φCLP which includes such a clamp pulse φCLP1 supplied to the clamp circuit 22 shown in FIG. 2, when the read gate pulse φROG is raised to a high level due to a reset applied in the course of transferring signal electric charge in the CCD shift register 13 (that is, in the course of outputting a picture element signal), the clamp circuit 22 clamps the sample/hold output Va to the reference level Vref over a period of time from the timing to apply the reset to a clamp period accompanying the next reset.

It should be noted that, when a reset is applied with ordinary reset timing, the clamp circuit 22 clamps the sample/hold output Va to the reference level Vref over a period of time between a halfway point of time in a signal output by the second OPB unit 11a and the end of an inhibit period of the transfer clocks φH1 and φH2 for a signal output by the empty transmission unit 13a of the CCD shift register 13 in response to the clamp pulse φCLP1 as is the case with the second embodiment. In addition, in response to the clamp pulse φCLP2, the clamp circuit 22 clamps the sample/hold output Va to the reference level Vref for a portion of a signal output by the first OPB unit 11b which portion represents the second picture element or a subsequent one.

When a reset is applied in the course of transferring signal electric charge in the CCD shift register 13, a newly read out signal is added to a residual signal being transferred in the CCD shift register 13, causing the picture element signals of the second and first OPB units 11a and 11b to increase by the magnitude of the residual signal. As a result, when only the signal output by the first OPB unit 11b is clamped, the signal voltages of the image sensing picture element signal portion with no residual signal, the second OPB unit 11a and the empty transmission unit 13a become higher than the reference potential Vref. Therefore, if the clamped output is supplied to the A/D converter 16 as it is, the A/D converter 16 will not function correctly and data resulting from the A/D conversion is therefore incorrect. Moreover, the A/D converter 16 itself is damaged in the worst case.

As described above, when the read gate pulse φROG is raised due to a reset applied in the course of transferring signal electric charge in the CCD shift register 13 (that is, in the course of outputting a picture element signal), the clamp circuit 22 clamps the sample/hold output Va to the reference level Vref over a period of time from the timing to apply the reset to a clamp period accompanying the next reset. Thus, the signal voltages of the image sensing picture element signal portion with no residual signal, the second OPB unit 11a and the empty transmission unit 13a can be suppressed to a level below the reference potential Vref. As a result, a signal voltage higher than the reference potential Vref can be prevented from being supplied to the A/D converter 16.

As described above, in the case of this embodiment, when a reset is applied in the course of transferring signal electric charge in the CCD shift register 13, the clamp circuit 22 clamps the sample/hold output Va to the reference level Vref over a period of time from the timing to apply the reset to a clamp period accompanying the next reset. It should be noted, however, that the scope of the present invention is not limited to this embodiment. As long as the sample/hold output for at least signal voltages with no residual signal components left is clamped to the reference level Vref, the effects described above can be obtained. This is because it is only the signal voltages with no residual signal component left exceed the clamp level Vref.

In addition, in the case of this embodiment, a combination with the second embodiment has been explained. It should be noted that the fifth embodiment can be combined with embodiments other than the second one. That is to say, the fifth embodiment can be combined with the first, third or fourth embodiment.

Figure 19:
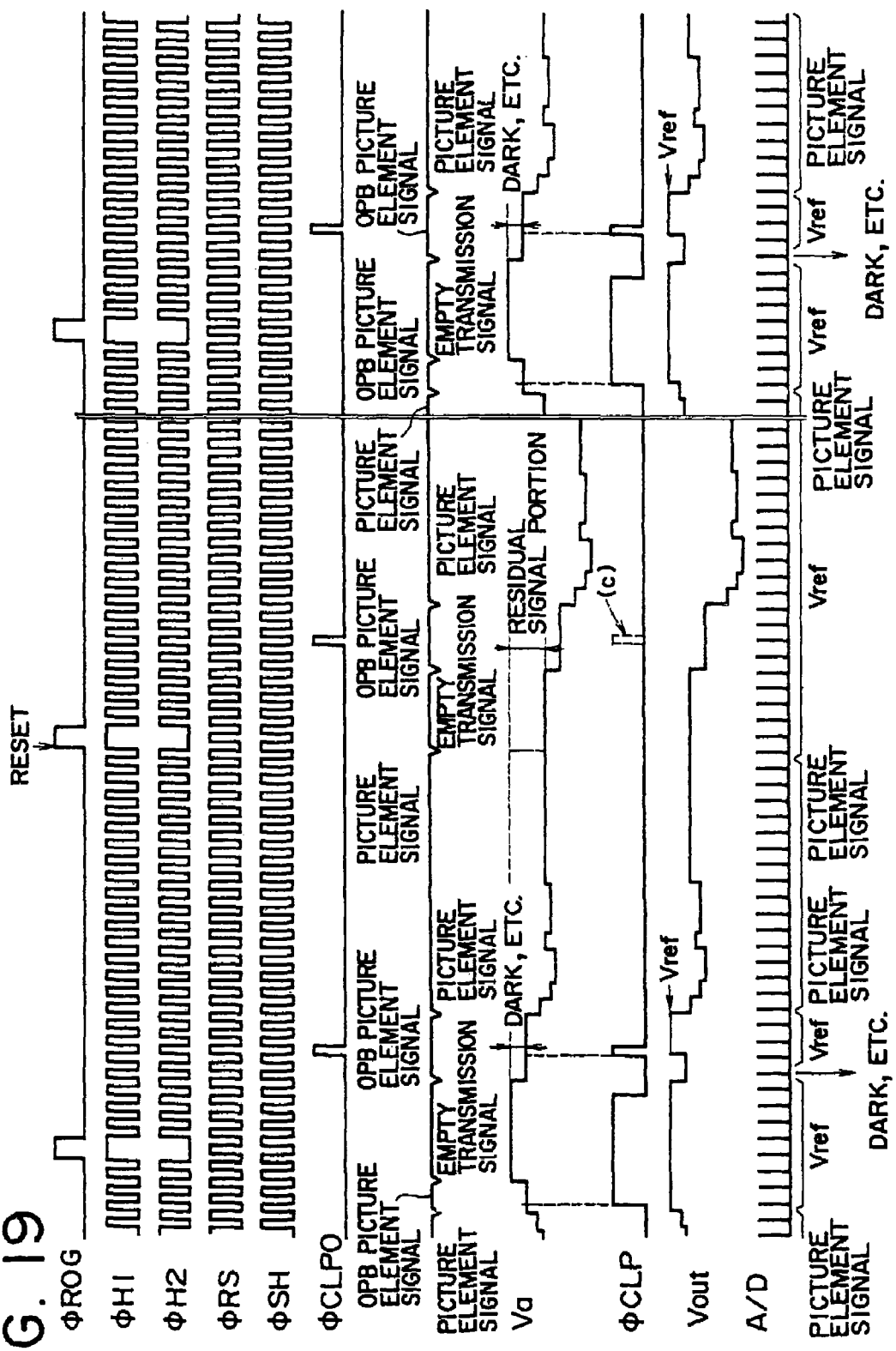
FIG. 19 shows timing charts used for explaining the operations of a sixth embodiment provided by the present invention.

Next, a sixth embodiment provided by the present invention is explained by referring to timing charts shown in FIG. 19. It should be noted that a picture element sequence shown in FIG. 19 is the same as the one shown in FIG. 16.

As is the case with the second embodiment, for example, in the timing generator 17 of the sixth embodiment for generating the clamp pulse signal φCLP1 for clamping a signal over a period of time between a halfway point of time in a signal output by the second OPB unit 11a and the end of an inhibit period of the transfer clock signal φH1 and φH2 for a signal output by the empty transmission unit 13a of the CCD shift register 13 and for generating the clamp pulse signal φCLP2 for clamping a portion of a signal output by the first OPB unit 11b which portion represents the second picture element or a subsequent one, when the read gate pulse φROG is raised to a high level due to a reset applied in the course of transferring signal electric charge in the CCD shift register 13 (that is, in the course of outputting a picture element signal), the generation of the clamp pulse φCLP is inhibited in synchronization with the reset.

Figure 20:
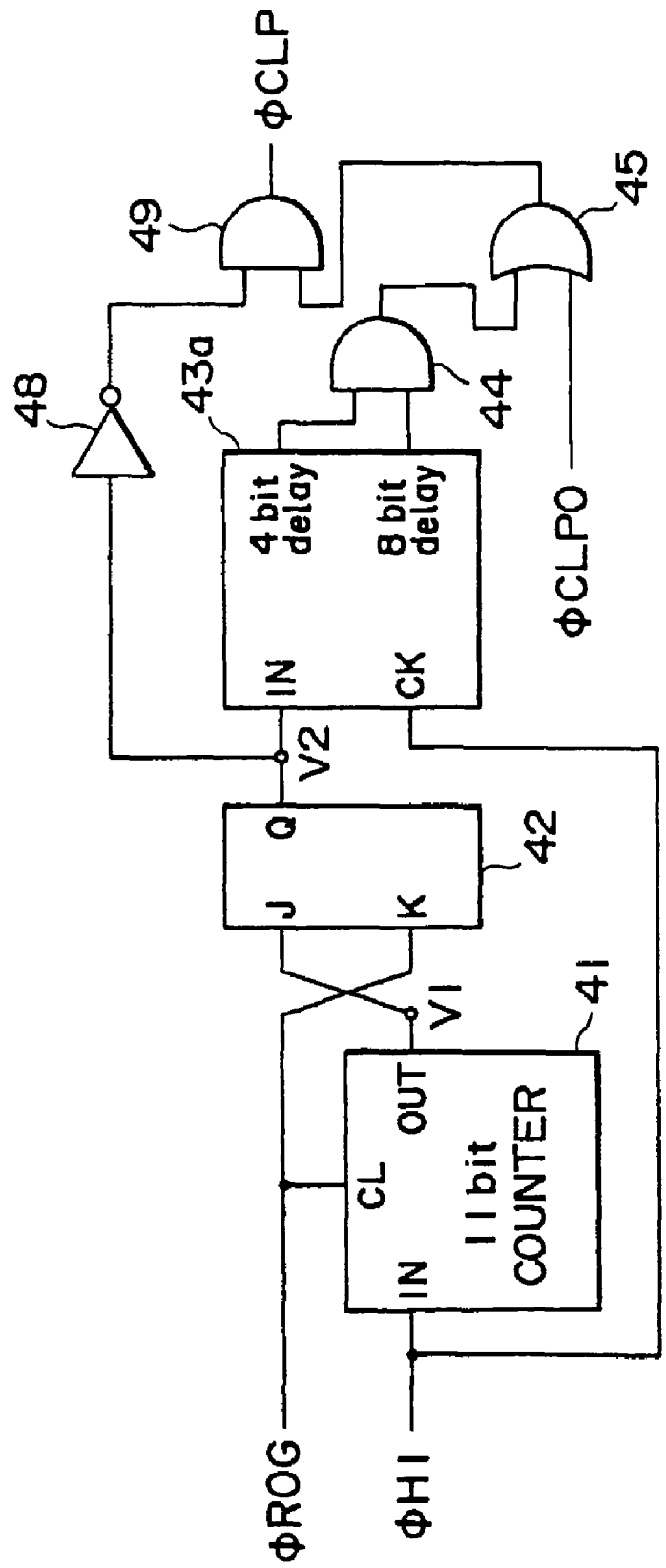
FIG. 20 is a block diagram showing a typical clamp-pulse generating circuit implemented by the sixth embodiment.

FIG. 20 is a block diagram showing a typical clamp-pulse generating circuit embedded in the timing generator 17 as is implemented by the sixth embodiment. It should be noted that the same notations and reference numerals as those used in the second embodiment shown in FIG. 8 are used in FIG. 20 for denoting components identical with those shown in FIG. 8. The clamp-pulse generating circuit implemented by the sixth embodiment basically has the same circuit configuration as the clamp-pulse generating circuit implemented by the second embodiment. That is to say, also in the case of the sixth embodiment, the Q output V2 of the JK flip-flop 42 is delayed by the shift register 43a by four bits and then further delayed by eight bits. The two 4-bit and 8-bit delayed outputs of the shift register 43 are supplied to the AND circuit 44 for producing a logical product of the two delayed outputs. The logical product produced by the AND circuit 44 and a clamp pulse φCLP0 are supplied to the OR circuit 45 for producing a logical sum thereof. Furthermore, the polarity of the Q output V2 of the JK flip-flop 42 is inverted by an inverter 48 and the outputs of the inverter 48 and the OR circuit 45 are supplied to a two-input AND circuit 49.

As described above, in the clamp-pulse generating circuit implemented by the sixth embodiment, the Q output V2 of the JK flip-flop 42 is delayed by the shift register 43a by four bits and then further delayed by eight bits. The two delayed outputs of the shift register 43 are supplied to the AND circuit 44 for producing a logical product of the two delayed outputs. The logical product produced by the AND circuit 44 and a clamp pulse φCLP0 are supplied to the OR circuit 45 for producing a logical sum thereof which logical sum serves as the clamp pulse signal φCLP comprising the clamp pulses φCLP1 and φCLP2 as is the case with the second embodiment. When a reset is applied in the course of transferring signal electric charge in the CCD shift register 13, on the other hand, the clamp pulse signal φCLP is inhibited by the Q output V2 turning to a low level, which indicates the application of the reset, by means of an AND circuit 49.

As described above, when the read gate pulse φROG is raised to a high level due to a reset applied in the course of transferring signal electric charge in the CCD shift register 13 (that is, in the course of outputting a picture element signal), the generation of the clamp pulse φCLP (c) is inhibited. Accordingly, even if a newly read out signal is added to a residual signal being transferred in the CCD shift register 13, causing the picture element signals of the OPB units 11a and 11b to increase by the magnitude of the residual signal, the signal voltages of the image sensing picture element signal portion with no residual signal, the second OPB unit 11a and the empty transmission unit 13a can be suppressed to a level below the reference potential Vref because the signals of the first OPB 11b units are not clamped. As a result, a signal voltage higher than the reference potential Vref can be prevented from being supplied to the A/D converter 16.

It should be noted that, when a reset is applied with ordinary reset timing, causing the read gate pulse φROG to rise to a high level, the clamp circuit 22 clamps the sample/hold output Va to the reference level Vref over a period of time between a halfway point of time in a signal output by the second OPB unit 11a and the end of an inhibit period of the transfer clocks φH1 and φH2 for a signal output by the empty transmission unit 13a of the CCD shift register 13 in response to the clamp pulse φCLP1 as is the case with the second embodiment. In addition, in response to the clamp pulse φCLP2, the clamp circuit 22 clamps the sample/hold output Va to the reference level Vref for a portion of a signal output by the first OPB unit 11b which portion represents the second picture element or a subsequent one.

In addition, in the case of this embodiment, a combination with the second embodiment has been explained. It should be noted that the sixth embodiment can be combined with embodiments other than the second one as is the case with the fifth embodiment. That is to say, the sixth embodiment can be combined with the first, third or fourth embodiment.

Figure 21:
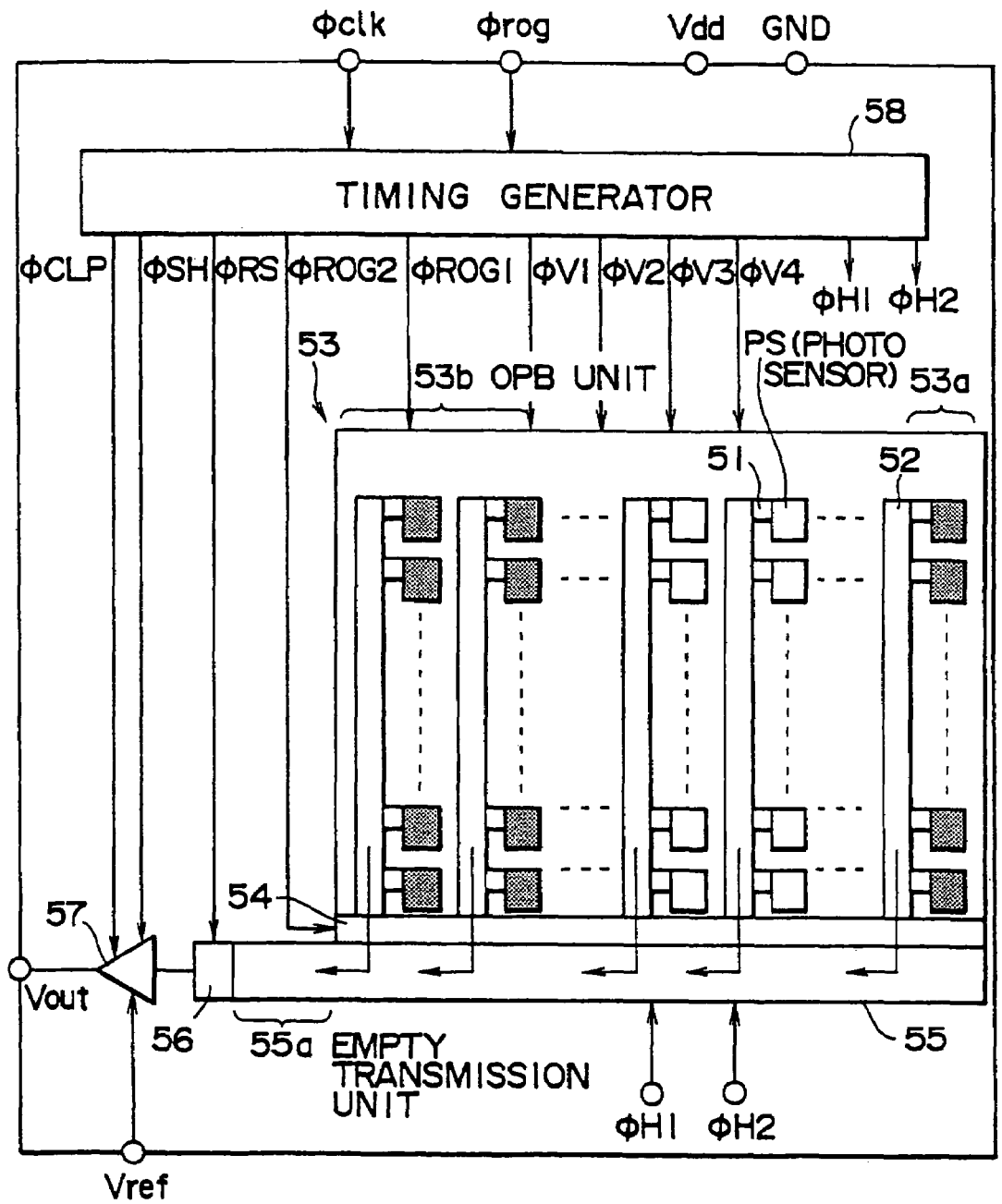
FIG. 21 is a configuration diagram showing a typical solid-state image sensing device employing area sensors in accordance with the present invention.

In the case of the embodiments described so far, the present invention is applied to a solid-state image sensing device employing linear sensors each serving as a CCD solid-state image sensing element. It should be noted that the present invention can also be applied to a solid-state image sensing device employing area sensors shown in FIG. 21. As shown in the figure, an image sensing unit 53 comprises a plurality of photosensors PS arranged to form a two-dimensional matrix and vertical CCD shift registers 52 each for transferring in the vertical direction signal electric charge read out from the photosensors PS through read gates 51. Each of the CCD shift registers 52 is associated with a vertical column of the photosensor matrix. At both ends of a plurality of vertical columns of the photosensor matrix of the image sensing unit 53, first and second OPB units 53b and 53a, which are each drawn as meshes of a net in the figure, are provided. In each of the OPB units 53a and 53b, a plurality of picture elements is shaded.

Signal electric charge read out from the photosensors PS into a vertical CCD shift register 52 is transferred sequentially to a horizontal CCD shift register 55 through a shift gate 54 in units each corresponding to a scan line. The signal electric charge of the scan line is sequentially transferred in the horizontal direction by the horizontal CCD shift register 55 and supplied to an electric-charge detecting unit 56. It is obvious from the figure that the horizontal CCD shift register 55 includes an empty transmission unit 55a for merely carrying out empty transmission of signal electric charge in addition to transfer regions associated with picture elements of the image sensing unit 53. As shown in the figure, the empty transmission unit 55a is provided at the end close to the electric-charge detecting unit 56.

Typically made by floating diffusion (FD), the electric-charge detecting unit 56 detects electric charge transferred by the horizontal CCD shift register 53 and injected into an FD unit of the electric-charge detecting unit 56 and converts the electric charge into a signal voltage to be supplied to a signal processing unit 57 at a later stage. Having the same circuit configuration as that shown in FIG. 2, the signal processing unit 57 is created on the same substrate as the CCD chip. Likewise, a timing generator 58 for generating a variety of timing signals is also created on the same substrate as the CCD chip.

The timing generator 58 generates:
(a) the reset pulse φRS described previously;
(b) a sample/hold pulse signal φSH;
(c) a clamp pulse signal φCLP;
(d) a read gate pulse signal φROG1 to be applied to a shift gate 51 for reading out signal electric charge from the photosensors PS to the vertical CCD shift register 52;
(e) four transfer clock signals φV1 to φV4 with different phases for driving the vertical CCD shift register 52;
(f) a read gate pulse signal φROG2 to be applied to the shift gates 54 for reading out signal electric charge from the vertical CCD shift register 52 to the horizontal CCD shift register 55; and
(g) two transfer clock signals φH1 to φH2 with different phases for driving the horizontal CCD shift register 55.

The operations of the horizontal CCD shift register 55, the electric-charge detecting unit 56 and the signal processing unit 57 employed in the solid-state image sensing device based on area sensors having a configuration described above are the same as the operations of the CCD shift register 13, the electric-charge detecting unit 14 and the signal processing unit 15 respectively employed in the solid-state image sensing device based on linear sensors described previously. Accordingly, the clamp pulse signal φCLP is generated by the timing generator 58 in the same way as the first, second, third, fourth, fifth or sixth embodiment to give the same effect as that obtained from the embodiment.

The clamp circuit 22 employed in the signal processing unit 57 (for details of the clamp circuit 22, refer to FIG. 2) clamps the sample/hold outputs of signals to the reference potential Vref of the A/D converter not shown in the figure which A/D converter is connected to a later stage of the signal processing unit 57. The signals include not only a signal output by the OPB unit 53b on the rear side of the image sensing unit 53 but also a portion of a signal output by the OPB unit 53a on the front side of the image sensing unit 53 or a signal output by the empty transmission unit 55a of the horizontal CCD shift register 55 including a portion of a signal of the last picture element preceding ahead by one line. As a result, a signal voltage higher than the reference potential Vref can be prevented from being supplied to the A/D converter.

According to one aspect of the present invention by clamping a signal portion corresponding to at least one picture element output by the OPB unit on the rear side in a signal output by the solid-state image sensing device and clamping a signal output by the empty transmission unit of the electric-charge transferring unit over a period of time covering an inhibit period of the transfer clocks, a high signal voltage generated accompanying transfer suspension due to the inhibition of the transfer clocks is masked out in order to prevent the high signal voltage from being supplied to the A/D converter at a later stage. As a result, it is possible to solve the problems that the A/D converter does not function correctly, data resulting from the A/D conversion is therefore damaged and, in addition, in a worst case, the A/D converter itself is damaged. Moreover, a signal level of the OPB unit which level serves as a reference of detection level of a dark current and the like can be detected.

According to another aspect of the present invention, by clamping a portion corresponding to at least a picture element of a signal output by the OPB unit on the rear side in a signal output by the solid-state image sensing device and clamping a signal over a period of time between a halfway point of time in a signal output by the OPB unit on the front side and a halfway point of time in a signal output by the empty transmission unit of the electric-charge transferring unit, a signal voltage higher than a reference voltage which signal voltage is caused by a dark current and the like is not generated at all over the entire empty transmission and, thus, not supplied to the A/D converter at a later stage. As a result, it is possible to solve the problems that the A/D converter does not function correctly, data resulting from the A/D conversion is therefore damaged and, in addition, if the worst comes to the worst, the A/D converter itself is damaged. Moreover, a signal level of the OPB unit which level serves as a reference of detection level of a dark current and the like can be detected.

According to still another aspect of the present invention, by clamping a signal portion corresponding to at least one picture element over a period of time between a halfway point of time in a signal output by an OPB unit on the front side and the end of an inhibit period of transfer clock signals of the electric-charge transferring unit for a signal output by the empty transmission unit of the electric-charge transferring unit, a high signal voltage generated in company with transfer suspension due to the inhibition of the transfer clocks is masked out in order to prevent the high signal voltage from being supplied to the A/D converter at a later stage in addition to the effects produced by the invention described in the preceding paragraph. As a result, it is possible to avoid the problems that the A/D converter does not function correctly, data resulting from the A/D conversion is therefore damaged and, in a worst case, the A/D converter itself is damaged.

According to a further aspect of the present invention, by clamping a signal portion corresponding to at least one picture element output by the OPB unit on the rear side in an output signal output by the solid-state image sensing element and clamping a signal over a period of time between a halfway point of time in a signal of the last picture element preceding ahead by one line and the end of an inhibit period of transfer clocks for a signal of the empty transmission unit of the electric-charge transferring unit, the signal voltage of the OPB unit on the front side can be masked out so that, even if there is a difference in level between the OPB units on the front and rear sides, a signal voltage higher than a reference potential by the level difference will not be supplied to the A/D converter at a later stage in addition to the effects produced by the invention described in the preceding paragraph. As a result, it is possible to avoid the problems that the A/D converter does not function correctly, data resulting from the A/D conversion is therefore damaged and in a worst case, the A/D converter itself is damaged.

According to a still further aspect of the present invention, by clamping at least a picture element signal not superpositioned on a picture element signal obtained from a previous read operation in case an operation to read electric charge is carried out in a transfer period of signal electric charge and by suppressing the signal voltages of the image sensing picture element signal portion with no residual signal, the OPB unit and the empty transmission unit to a level below a reference voltage, the signal voltages of the image sensing picture element signal portion with no residual signal, the OPB unit and the empty transmission unit will never exceed the reference voltage even if a reset is applied in the course of transferring signal electric charge, causing a newly read out signal to be superpositioned on a residual signal being transferred in the electric-charge transferring unit. As a result, it is possible to avoid the problems that the A/D converter does not function correctly, data resulting from the A/D conversion is therefore damaged and, in a worst case, the A/D converter itself is damaged.

According to a still further aspect of the present invention, by inhibiting the generation of clamp pulses in synchronization with an operation to read out electric charge which operation is carried out in a transfer period of signal electric charge in the event of such a read operation, the signal voltages of the image sensing picture element signal portion with no residual signal, the OPB unit and the empty transmission unit will never exceed the reference voltage even if a reset is applied in the course of transferring signal electric charge, causing a newly read out signal to be superpositioned on a residual signal being transferred in the electric-charge transferring unit and causing the picture element of the OPB units to increase by the residual signal portion because the signals of the OPB units are not clamped. As a result, it is possible to avoid the problems that the A/D converter does not function correctly, data resulting from the A/D conversion is therefore damaged and, in a worst case, the A/D converter itself is damaged.

What is claimed:

1. A solid state imaging system comprising:
   a solid state image sensing element adapted to generate signal charges, said solid state image sensing element having a sensor unit;
   a transferring unit adapted to transfer said signal charges read out from said sensor unit;
   a clamp circuit to which electrical signal is transferred from said transfer unit and to generate clamp pulse for clamping said electrical signal to a reference voltage,
   wherein said clamp pulse are rising in all time that said signal charge is read out from said image sensing unit to said transferring unit,
   wherein said inhibit period of said transfer clocks exists within a period of said empty transmission signal.

2. A solid state imaging system comprising:
   a solid state image sensing element adapted to generate signal charges, said solid state image sensing element having a sensor unit;
   a transferring unit adapted to transfer said signal charges read out from said sensor unit;
   a clamp circuit to which electrical signal is transferred from said transfer unit and to generate clamp pulse for clamping said electrical signal to a reference voltage;
   a sample and hold circuit connected between said sensor unit and said clamp circuit, wherein said clamp pulse are rising in all time that said signal charge is read out from said image sensing unit to said transferring unit.

3. A solid state imaging system according to claim 1, wherein said clamp circuit is adapted to clamp at least an electrical signal not superpositioned on another electrical signal output by a previous read operation when an operation to read out said signal charge is carried out in a transfer period of signal electric charge.

4. A solid state imaging system according to claim 1, further comprising:
an A-to-D converter connected to said clamp circuit for converting the clamped electrical signal to a digital signal.

5. A solid state imaging system according to claim 1, further comprising:

a sample and hold circuit connected between said sensor unit and said clamp circuit.

6. A solid state imaging system according to claim 2, wherein said clamp circuit is adapted to clamp at least an electrical signal not superpositioned on another electrical signal output by a previous read operation when an operation to read out said signal charge is carried out in a transfer period of signal electric charge.

7. A solid state imaging system according to claim 2, further comprising:
an A-to-D converter connected to said clamp circuit for converting the clamped electrical signal to a digital signal.

* * * * *